(12) United States Patent  (10) Patent No.: US 9,176,635 B2
Jun et al.  (45) Date of Patent: Nov. 3, 2015

(54) VIRTUAL BUTTONS FOR A TOUCH INTERFACE

(71) Applicant: Cypress Semiconductor Corporation, San Jose, CA (US)

(72) Inventors: Kab Jin Jun, Seoul (KR); Kyoung Soo Kim, Seoul (KR)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/495,547

(22) Filed: Sep. 24, 2014

(65) Prior Publication Data

US 2015/0109243 A1  Apr. 23, 2015

Related U.S. Application Data

(60) Provisional application No. 61/890,757, filed on Oct. 14, 2013, provisional application No. 61/943,799, filed on Feb. 24, 2014, provisional application No. 62/005,095, filed on May 30, 2014.

(51) Int. Cl.
*G06F 3/044* (2006.01)

(52) U.S. Cl.
CPC ..................................... *G06F 3/044* (2013.01)

(58) Field of Classification Search
CPC ............... G06F 3/044; G06F 3/04886; G06F 2203/04101; G06F 2203/04108
USPC .................................................. 345/173–178
See application file for complete search history.

(56) References Cited

U.S. PATENT DOCUMENTS

| | | | |
|---|---|---|---|
| 4,914,624 A | 4/1990 | Dunthorn | |
| 8,125,455 B2 | 2/2012 | Land et al. | |
| 8,335,993 B1 | 12/2012 | Tan | |
| 8,446,381 B2 | 5/2013 | Molard et al. | |
| 8,619,039 B2 | 12/2013 | Yang et al. | |
| 8,682,606 B2 | 3/2014 | Horodezky et al. | |
| 8,723,824 B2 | 5/2014 | Myers et al. | |
| 2007/0273659 A1* | 11/2007 | XiaoPing et al. | 345/173 |
| 2010/0085317 A1* | 4/2010 | Park et al. | 345/173 |
| 2010/0137027 A1* | 6/2010 | Kim | 455/556.1 |
| 2012/0032905 A1* | 2/2012 | Koshiyama et al. | 345/173 |
| 2012/0044199 A1* | 2/2012 | Karpin et al. | 345/174 |
| 2012/0110662 A1 | 5/2012 | Brosnan | |
| 2013/0076649 A1* | 3/2013 | Myers et al. | 345/173 |
| 2013/0234978 A1* | 9/2013 | Ksondzyk | 345/174 |
| 2013/0342497 A1 | 12/2013 | Mo et al. | |
| 2014/0011584 A1 | 1/2014 | Shin et al. | |
| 2014/0043277 A1* | 2/2014 | Saukko et al. | 345/174 |

OTHER PUBLICATIONS

Cristin2010, "Android System Touch Screen Virtual Buttons," phonedevelopers.com, Jan. 19, 2010; 11 pages.

(Continued)

*Primary Examiner* — Liliana Cerullo
(74) *Attorney, Agent, or Firm* — Morgan, Lewis & Bockius LLP

(57) ABSTRACT

A circuit, method, and system is disclosed for measuring capacitance of a plurality of electrodes, detecting a presence of a conductive object proximate to at least one of the plurality of electrodes near an edge of a touchscreen display based on the measured capacitance, assigning a value to at least one virtual sensor derived from the measured capacitance of the at least one of the plurality of electrodes near the edge of the touchscreen display and activating at least one control element associated with a location outside the display area based on the value of the at least one virtual sensor.

19 Claims, 27 Drawing Sheets

(56) References Cited

OTHER PUBLICATIONS

Freeland, Muir, "Virtual Buttons Are Holding Mobile Games Back," Gamasutra.com, Sep. 24, 2012; 6 pages.

International Search Report for International Application No. PCT/US14/68208 dated Mar. 4, 2015; 2 pages.

Written Opinion of the International Searching Authority for International Application No. PCT/US14/68208 dated Mar. 4, 2015; 4 pages.

* cited by examiner

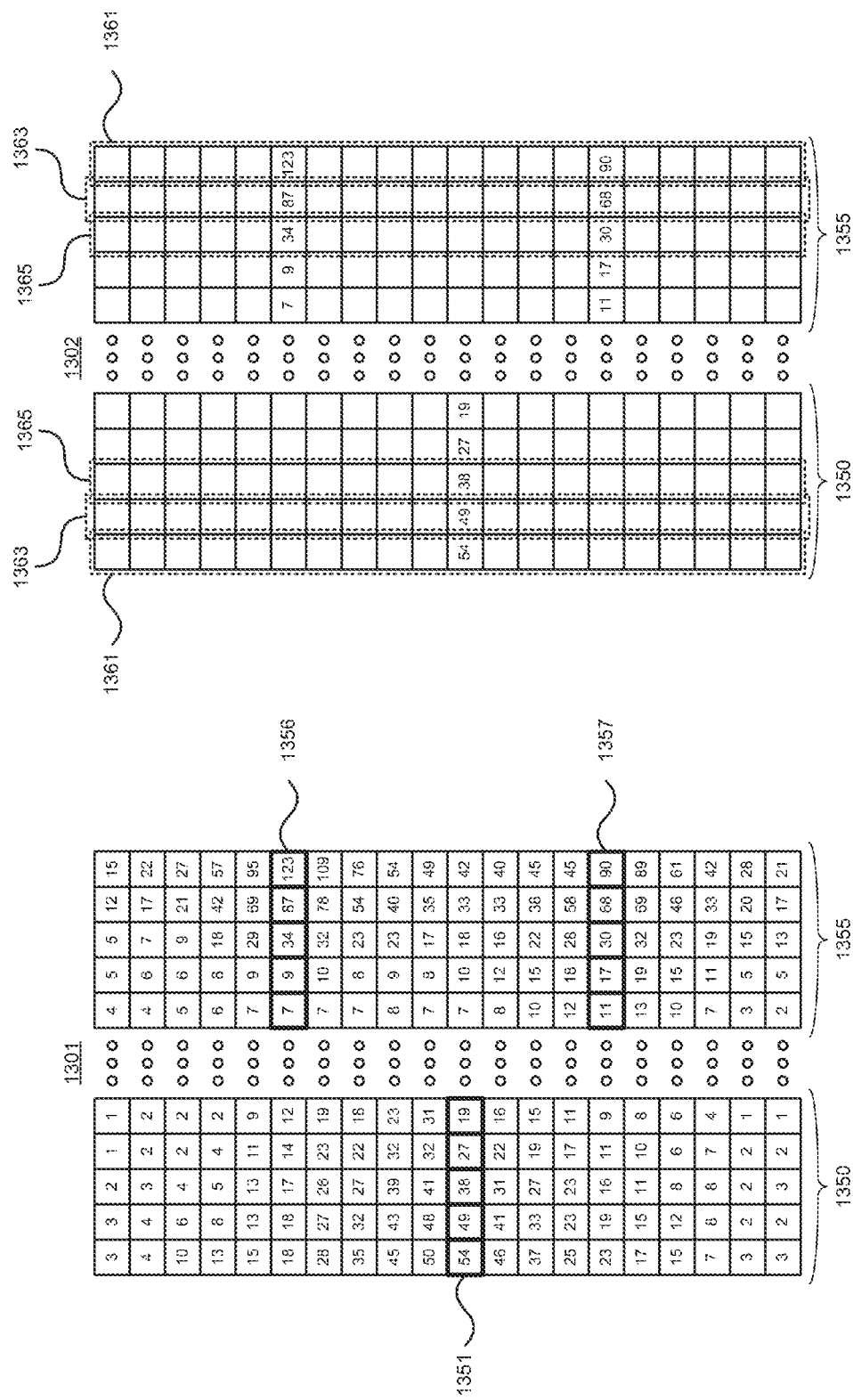

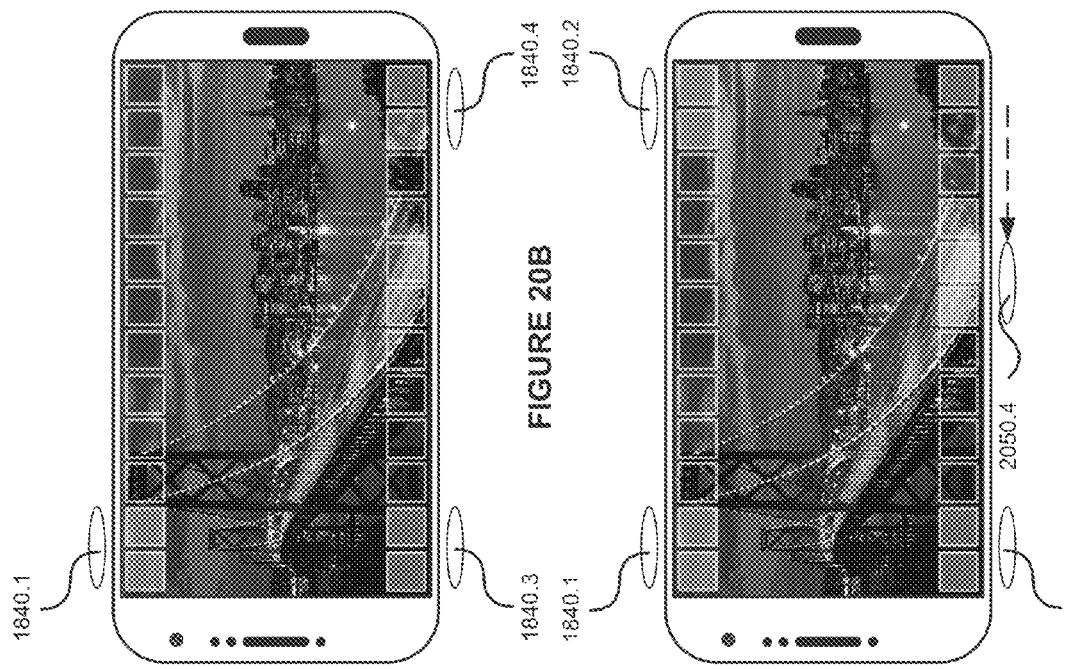
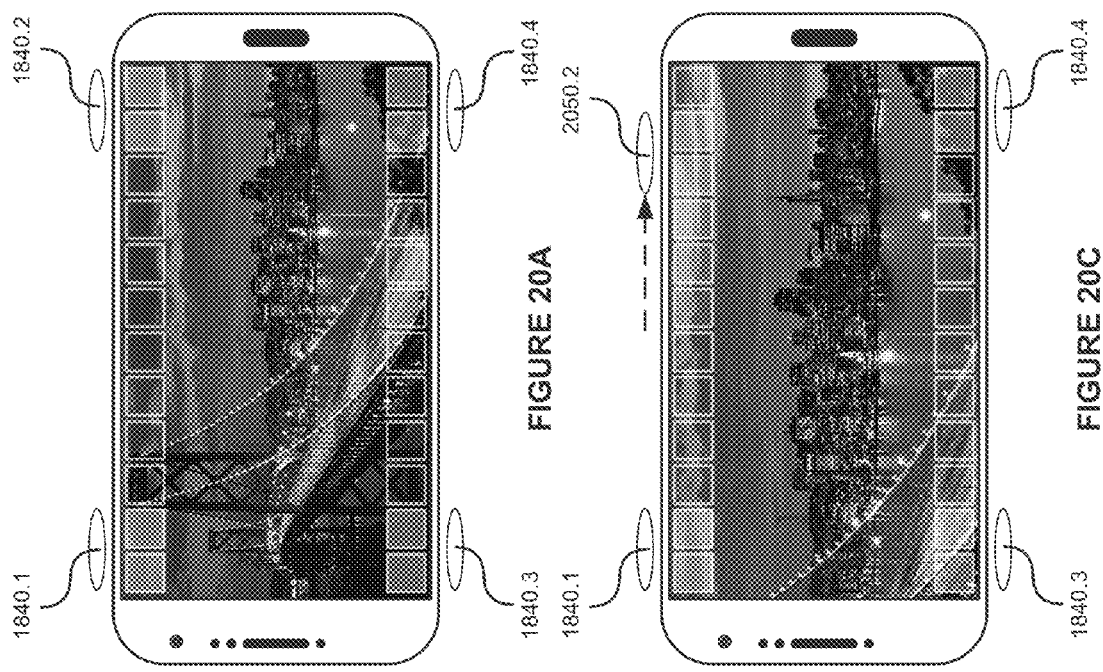

VIRTUAL BUTTONS FOR A TOUCH INTERFACE

RELATED APPLICATION

This patent application claims the benefit of U.S. Provisional Patent Application No. 61/943,799, filed Feb. 24, 2014, and U.S. Provisional Patent Application 62/005,095, filed May 30, 2014, and U.S. Provisional Patent Application 61/890,757, filed Oct. 14, 2013, which are incorporated by reference herein.

TECHNICAL FIELD

This disclosure relates generally to electronic systems, and, more particularly, touchscreen interfaces and operation.

BACKGROUND

Capacitance sensing systems can sense electrical signals generated on electrodes that reflect changes in capacitance. Such changes in capacitance can indicate a touch event (e.g., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern consumer applications, providing user interface options in existing products. Capacitive sense elements can range from a single button to a large number of sensors arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a change in capacitance indicating a touch or presence of a conductive object. When a conductive object (e.g., a finger, hand, or other object) comes into contact or close proximity with a capacitive sense element or surface above a capacitive sense element, the capacitance changes and the conductive object is detected. The capacitance changes of the capacitive touch sense elements can be measured by an electrical circuit. The electrical circuit converts the capacitances of the capacitive sense elements into digital values.

SUMMARY

A method is disclosed for detecting activation of at least one virtual sensor, the method comprising measuring capacitance of a plurality of electrodes, detecting a presence of a conductive object proximate to at least one of the plurality of electrodes near an edge of a touchscreen display based on the measured capacitance, assigning a value to at least one virtual sensor derived from the measured capacitance of the at least one of the plurality of electrodes near the edge of the touchscreen display, and activating at least one control element associated with a location outside the display area based on the value of the at least one virtual sensor.

A user interface device is disclosed that comprises a first plurality capacitance sensing electrodes disposed along a first axis of an array, a second plurality of capacitance sensing electrodes disposed along a second axis of an array, and a controller. The controller may be configured to measure a mutual capacitance between the first and second pluralities of capacitance sensing electrodes, detect a presence of a conductive object at an edge of the array, and assign a value to at least one virtual sensor derived from the measured capacitance between the first and second pluralities of capacitance sensing electrodes.

A handheld display device disclosed. The handheld device comprises a display, a plurality of capacitance sensing electrodes disposed substantially over the display, and a touch controller. The touch controller of the handheld display device may configured to measure capacitance on the plurality of capacitance sensing electrodes and determine activation states for at least one virtual sensor, wherein the at least one virtual sensor is positioned outside an area defined by the plurality of capacitance sensing nodes.

DESCRIPTION OF THE DRAWINGS

FIG. 13B illustrates an array of unit cells with capacitance measurement values corresponding to a hover and a grip contact.

FIG. 13C illustrates an array of unit cells with unit cells or groups of unit cells used in the determination of a hover or a grip contact.

FIGS. 20A and 20B illustrates activation and deactivation of a "shutter" button by virtual sensors, according to one embodiment.

FIG. 20C illustrates an embodiment of a zoom function implemented with virtual sensors, according to one embodiment.

FIG. 20D illustrates an embodiment of a brightness control function implemented with virtual sensors, according to one embodiment.

DETAILED DESCRIPTION

Figure 1A:
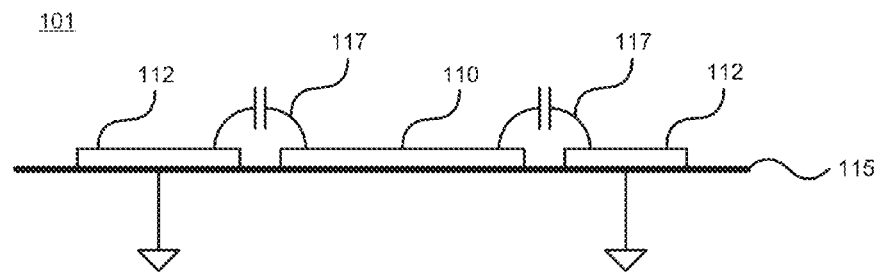
FIG. 1A illustrates a representation of self capacitance, according to one embodiment.

In the following description, for purposes of explanation, numerous specific details are set forth in order to provide a thorough understanding of the embodiments of the present invention discussed herein. It will be evident, however, to one skilled in the art that these and other embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

For simplicity and clarity of illustration, reference numerals may be repeated among the figures to indicate corresponding or analogous elements. Numerous details are set forth to provide an understanding of the embodiments described herein. The examples may be practiced without these details. In other instances, well-known methods, procedures, and components are not described in detail to avoid obscuring the examples described. The description is not to be considered as limited to the scope of the examples described herein.

Capacitance

A capacitor is formed by two conductive plates that are separated by a space filled with a dielectric material. The capacitance of a capacitor made of two large plates (in farads), C, is given by:

$$C = \epsilon_r \epsilon_0 A/d, \quad (1)$$

where A is the area of overlap between the two conductive plates ($m^2$), d is the distance between the two conductive plates (m), $\epsilon_r$ is the dielectric constant of the material between the two conductive plates, and $\epsilon_0$ is the electric constant ($\epsilon_0 \approx 8.854 \times 10^{-12}$ F·$m^{-1}$). In addition, fringe capacitances along the edges of two adjacent conductive plates adds to the total capacitance therebetween.

In one embodiment, the conductive plates may be conventional metal plates (such as copper electrodes). In another embodiment, the conductive plates may be formed from a transparent conductive material (such as indium tin oxide, "ITO"), silver or carbon ink, or metal mesh. In still another embodiment, a conductive plate may be a human finger or palm. Any material that is capable of conducting electricity may serve as a conductive plate of a capacitor.

A capacitor can store a charge transferable to other portions of a circuit. The charge stored by a capacitor (in coulombs), q, is given by:

$$q=CV, \qquad (2)$$

where C is the capacitance of the capacitor given in equation (1) as well as the fringe capacitance and V is the voltage differential between the two conductive plates.

A capacitance may be measured as a self capacitance, the capacitance of a single conductive plate (electrode) to its surroundings which serve as the second conductive plate, or as mutual capacitance, the capacitance between two specific conductive plates. Self and mutual capacitances may be changed by the presence of additional conductive plates, such as a finger, in proximity to the conductive plates under test. For the purposes of this description, conductive plates are referred to as "electrodes" or "sensors." This is not intended to be limiting as circuits may describe the conductive plates of a capacitor in different terms. Additionally, while a finger is a conductive plate for the purposes of creating a capacitor, it may not be referred to as an "electrode" or "sensor." While fingers are used in the following description to be representative of the conductive object that is sensed by the capacitance sensor and measurement circuit, other conductive objects may be used.

Sensor Construction

Figure 7A:
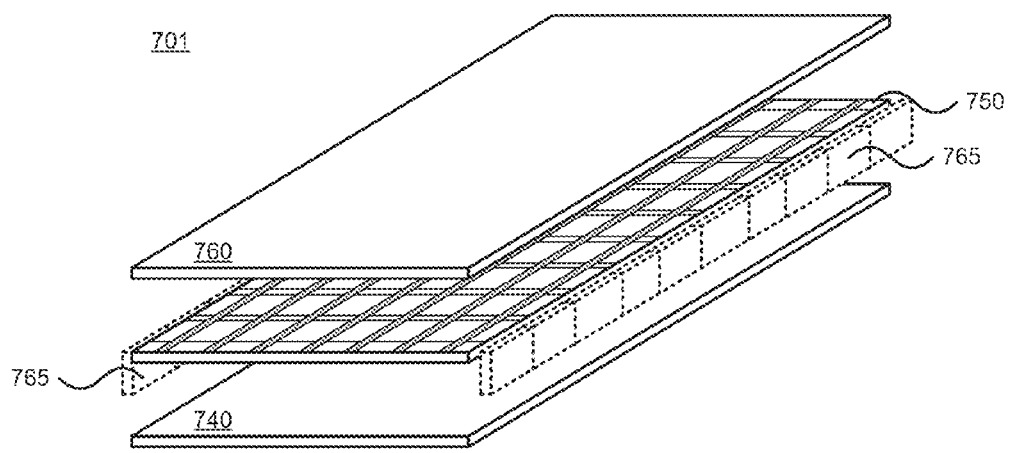
FIG. 7A illustrates a stack-up of a touchscreen, according to one embodiment.
Figure 7B:
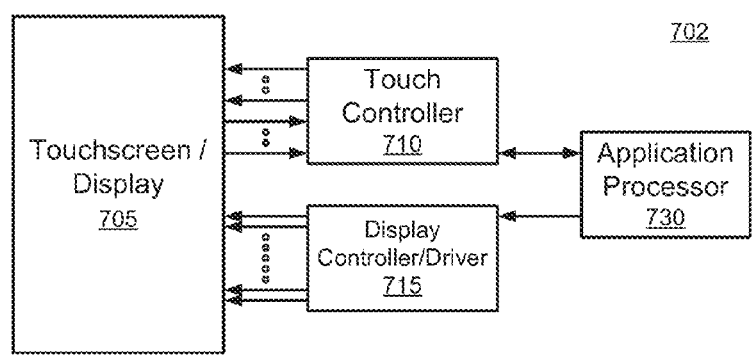
FIG. 7B illustrates a touchscreen system, according to one embodiment.

FIG. 1A illustrates a representation of self capacitance in a system 101 according to one embodiment. An electrode 110 may be disposed on a substrate 115. A capacitance 117 may exist between electrode 110 and at least one other electrode 112 according to Equation (1). In one embodiment, electrodes 110 and 112 may be formed from copper. In another embodiment, electrodes 110 and 112 may be formed from a transparent conductive material such as indium tin oxide (ITO). In still another embodiment, electrodes 110 and 112 may be formed from silver or carbon ink, metal mesh, or another conductive material. Substrate 115 may be glass in one embodiment. In other embodiments, substrate 115 may be a plastic film (such as polyethylene terephthalate, "PET", or some other polycarbonate), a flexible printed circuit board material, or a rigid printed circuit board material (such as FR4). Substrate 115 may be a separate layer or it may be part of a larger, integrated system as shown in FIGS. 7A and 7B below. While capacitance 117 is shown to be between electrode 110 and electrodes 112, which are coupled to a ground voltage potential, one of ordinary skill in the art would understand that the capacitances between electrodes 110 and 112 may exist at any voltage potential and that a ground connection is not required. Additionally, although only capacitive coupling between electrode 110 and electrode 112 is shown, electrode 110 may capacitively couple to circuit elements not shown in FIG. 1A.

Figure 1B:
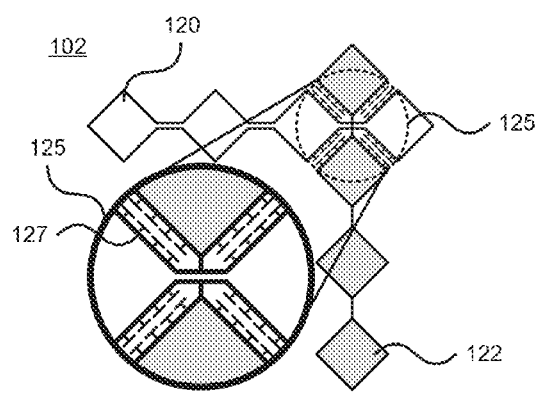
FIG. 1B illustrates a representation of mutual capacitance between a row and a column electrode comprised of diamond-shaped sense elements, according to one embodiment.

FIG. 1B illustrates a representation of mutual capacitance in a system 102 according to one embodiment. A first electrode 120 including multiple diamond-shaped elements may be disposed on a substrate (not shown) along a first axis. A second electrode 122 including multiple diamond-shaped elements may be disposed along a second axis. In one embodiment, there may be a mutual capacitance 127 at the intersection 125 of the electrodes 120 and 122.

In various embodiments, electrodes 120 and 122 may be formed from copper, a transparent conductive material such as ITO, silver or carbon ink, metal mesh, or other conductive materials or combinations of conductive materials. The substrate (e.g., see substrate 115 of FIG. 1A), in various embodiments, may be glass, plastic film (such as polyethylene terephthalate, "PET", or some other polycarbonate), a flexible printed circuit board material, or a rigid printed circuit board material (such as FR4). Additionally, among embodiments, the substrate may be a separate layer or it may be part of a larger, integrated system as shown in FIGS. 7A and 7B below, for example. In one embodiment, electrodes 120 and 122 may be disposed on two different substrates that are adhered together. In other embodiments, electrodes 120 and 122 may be disposed on two sides of the same substrate or may be disposed on the same side of a substrate and the connections for either electrode 120 or electrode 122 formed by a jumper between individual elements of electrodes 120 and 122 and disposed over a dielectric material.

Figure 1C:
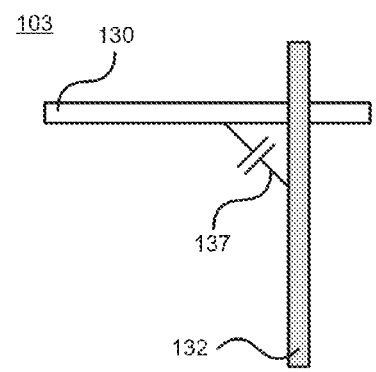
FIG. 1C illustrates a representation of mutual capacitance between a row and a column of bar-shaped electrodes, according to one embodiment.

FIG. 1C illustrates another representation of mutual capacitance in a system 103 according to another embodiment. A first electrode 130 may be disposed on a substrate (e.g., see substrate 115 of FIG. 1A) along a first axis. A second electrode 132 may be disposed along a second axis. Electrodes 130 and 132 may be bar-shaped in one embodiment. In another embodiment, electrodes 130 and 132 may have more complex structures that are based on the bar-shaped theme. At the intersection of electrodes 130 and 132 there may exist a mutual capacitance 137. In one embodiment, electrodes 130 and 132 may be formed from copper. In another embodiment, electrodes 130 and 132 may be formed from a transparent conductive material such as ITO. In still another embodiment, electrodes 110 and 112 may be formed from silver or carbon ink, metal mesh, or another conductive material.

Mutual capacitances 127 and 137 may be used to detect the location of one or more conductive objects on or near a surface (e.g. FIGS. 6A through 6E). An array of mutual capacitances (see description of FIGS. 2A and 2B below) may be used to detect one or more conductive objects on an edge of a device with a touch surface. In one embodiment, the edge on which the conductive object is placed may be a surface perpendicular to the substrate on which the electrodes are disposed, as shown in FIG. 7A.

In various embodiments, electrodes 130 and 132 may be formed from copper, a transparent conductive material such as indium tin oxide (ITO), silver or carbon ink, metal mesh, or other conductive materials or combinations of conductive materials. The substrate (e.g., see substrate 115 of FIG. 1A), in various embodiments, may be glass, plastic film (such as PET or some other polycarbonate), a flexible printed circuit board material, or a rigid printed circuit board material (such as FR4). Additionally, among embodiments, the substrate may be a separate layer or it may be part of a larger, integrated system as shown in FIGS. 7A and 7B below, for example. In one embodiment, electrodes 130 and 132 may be disposed on two different substrates that are adhered together. In other embodiments, electrodes 130 and 132 may be disposed on two sides of the same substrate or may be disposed on the same side of a substrate and the connections for either electrode 130 or electrode 132 formed by a jumper between individual elements of electrodes 130 and 132 and disposed over a dielectric material.

Figure 2A:
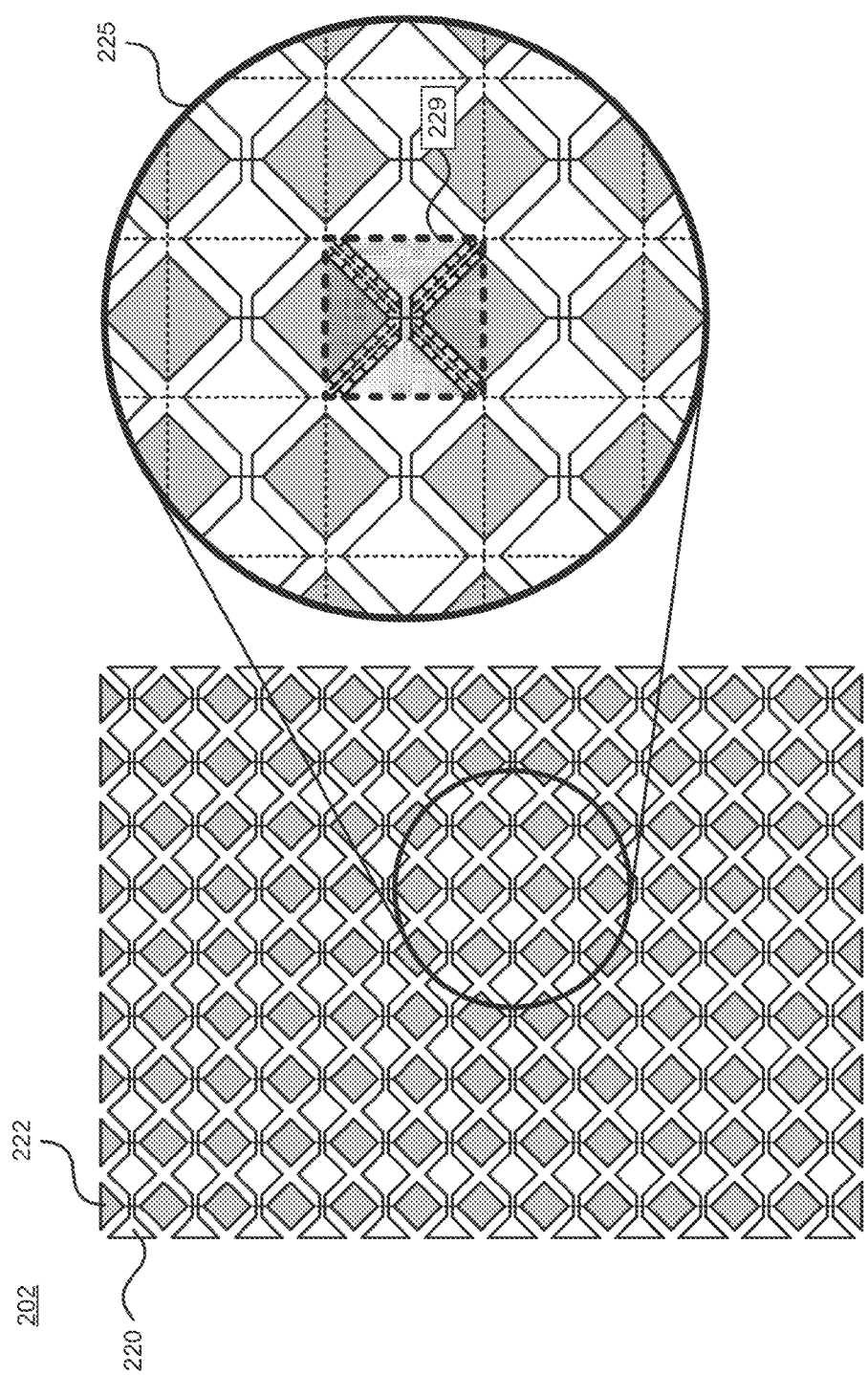
FIG. 2A illustrates an array of diamond-shaped sense elements arranged in a two-dimensional array, according to one embodiment.
Figure 11:
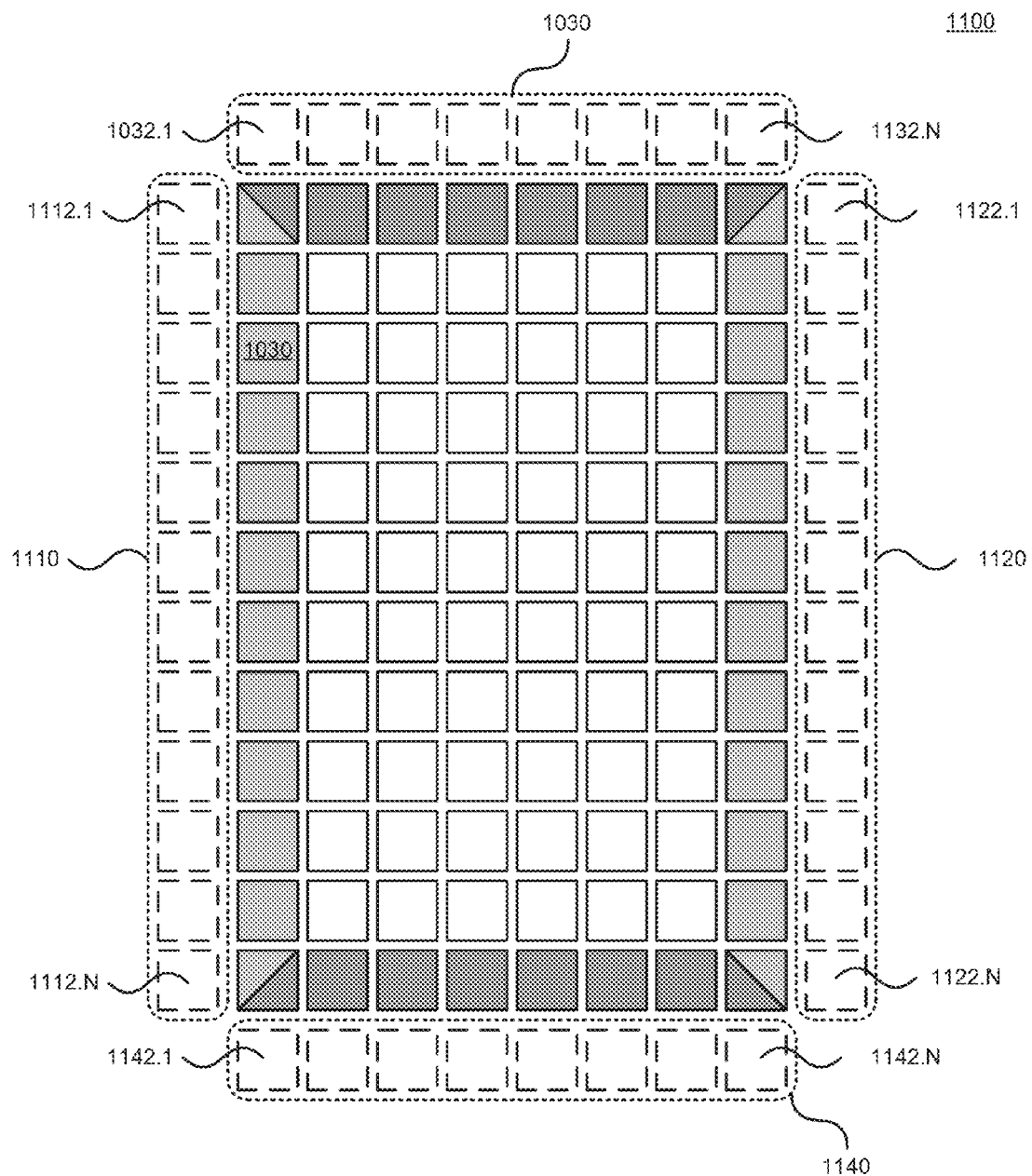
FIG. 11 illustrates an array of unit cells and virtual sensors, according to one embodiment.

FIG. 2A illustrates an array of electrodes 202 similar to those shown in FIG. 1B. A first plurality of electrodes 220 including multiple diamond-shaped elements may disposed on a substrate (not shown) along a first axis. A second plurality of electrodes 222 including multiple diamond-shaped elements may disposed on a substrate along a second axis. Close-up 225 illustrates the intersection between the first plurality of electrodes 220 and the second plurality of electrodes 222. There may be a mutual capacitance at the intersection an electrode from the first plurality of electrodes 220 and an electrode of the second plurality of electrodes 222 (e.g., like mutual capacitance 127 of FIG. 1B). This region of mutual capacitance may be described as a unit cell 229 of the array of electrodes 202. Unit cells exist at every intersection and may be used to detect the location of a conductive object or to detect the presence of at least one conductive object along an edge of a touchscreen-enabled device as shown in FIGS. 7A, 11, and 16.

Figure 2B:
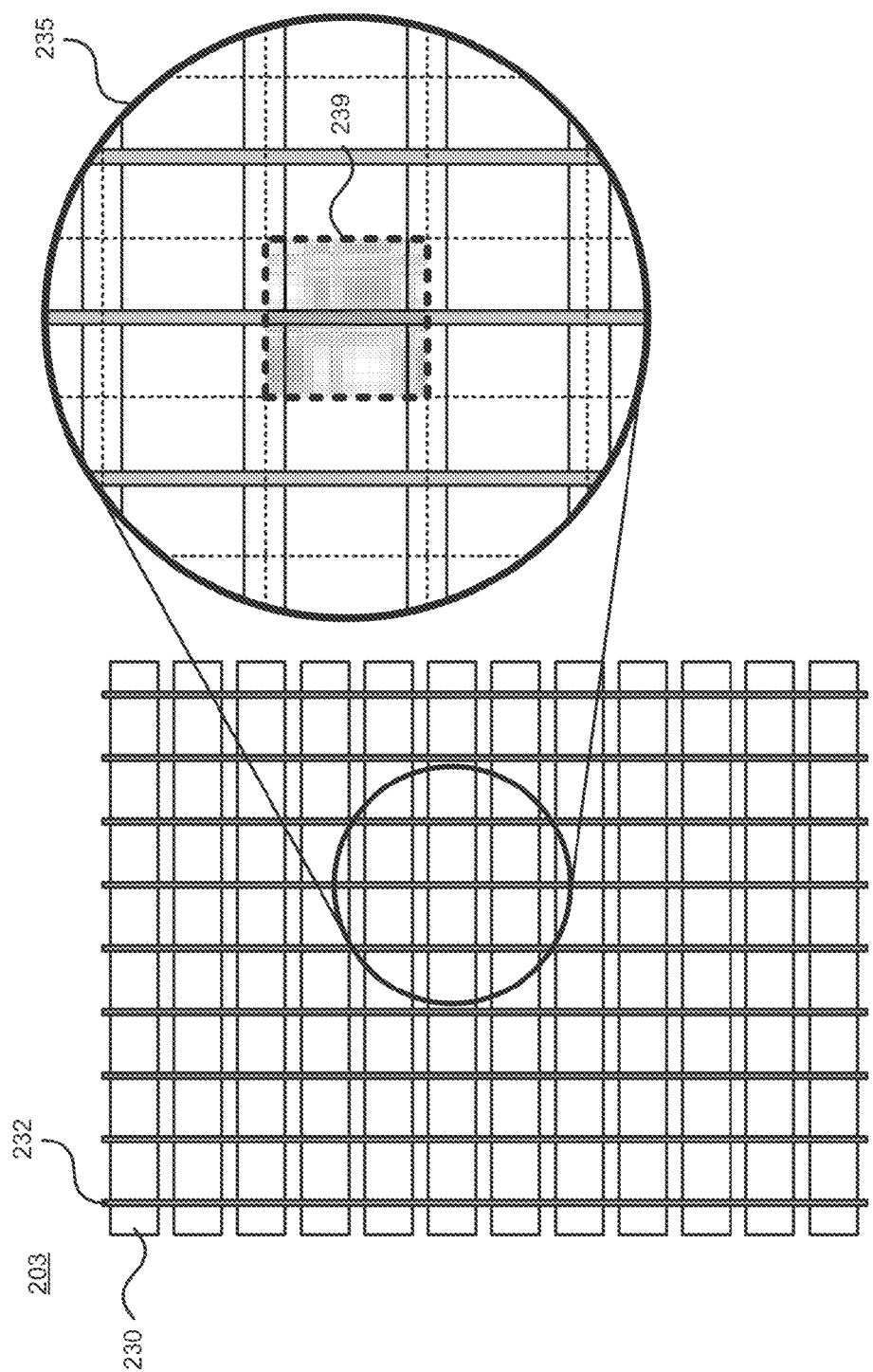
FIG. 2B illustrates an array of bar-shaped electrodes arranged in a two dimensional array, according to one embodiment.

FIG. 2B illustrates an array of electrodes 203 similar to those shown in FIG. 1C. A first plurality of electrodes 230 may be disposed on a substrate (not shown) along a first axis. A second plurality of electrodes 232 may be disposed on a substrate along a second axis. Electrodes 230 and 232 may be bar-shaped in one embodiment. In another embodiment, electrodes 230 and 232 may have more complex structures that are based on the bar-shaped theme. Close-up 235 illustrates the intersection between the first plurality of electrodes 230 and the second plurality of electrodes 232. Similar to FIG. 2A there may be a mutual capacitance at the intersection an electrode from the first plurality of electrodes 230 and an electrode of the second plurality of electrodes 232 and this region of mutual capacitance may be described as a unit cell 239 of the array of electrodes 203. Unit cells exist at every intersection and may be used to detect the location of a conductive object or to detect the presence of at least one conductive object along an edge of a touchscreen-enabled device as shown in FIGS. 7A, 11, and 16.

Unit cells 229 and 239 and their measured capacitance values may be used to detect the location of one or more conductive objects on or near a surface (e.g. FIGS. 6A through 6E) or they may be used to provide calibration signals or bias currents to a self capacitance measurement circuit (e.g. channel 320 of FIG. 10). An array of unit cells may be used to detect one or more conductive objects on an edge of a device with a touch surface. In one embodiment, the edge on which the conductive object is placed may be a surface perpendicular to the substrate on which the electrodes are disposed, as shown in FIG. 7A.

Unit cells 229 and 239 may be conceptualized geometrically as the smallest unit of tessellation. That is, the smallest repeatable unit of measurement on the array. Unit cells 229 and 239 may also be conceptualized by stating that every point within the unit cell is closer to the center of that unit cell (the center of the intersection between the electrodes on different axes) than it is to the center of any other unit cell. Unit cells 229 and 239 may be conceptualized functionally as the native resolution of the arrays 202 and 203. That is, each row and column may be identified and a position defined on each row and column. For a rectangular array with twelve columns and nine rows, there may be 108 discrete locations. Since unit cell 229 exists between the seventh row (from the top) and the sixth column (from the left) and unit cell 239 exists at the intersection between the sixth row and the sixth column, their positions may be given by 6,7 and 6,6, respectively, based on the native resolution of arrays 202 and 203. Unit cells 229 and 239 may be conceptualized as pixels of an array, wherein each pixel may be assigned a location and a measurable value specific to that location. An example of a pixel-based interpretation of unit cells is given in FIGS. 6A and 6B below. Unit cells 229 and 239 may also be referred to as "nodes" wherein each intersection of the row and column electrodes is a node of the array.

Capacitance Sensing

Figure 3A:
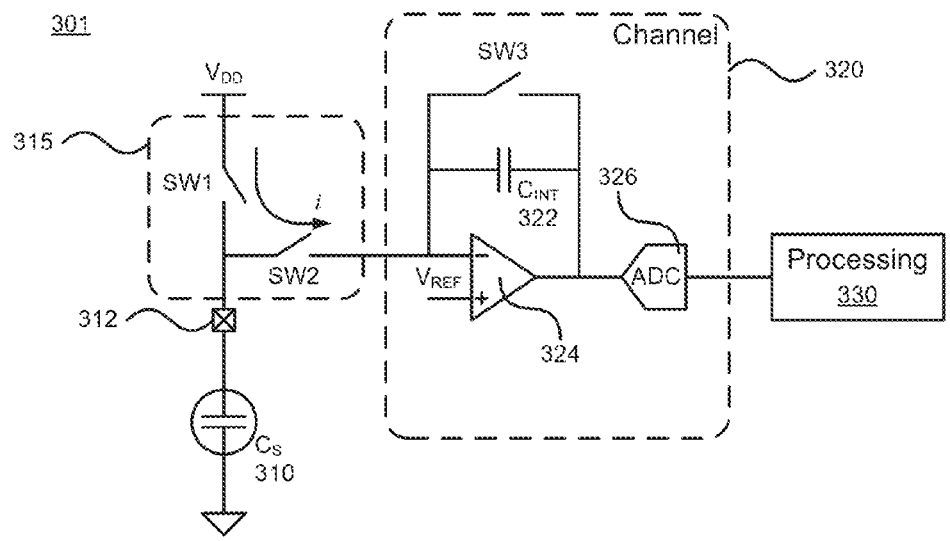
FIG. 3A illustrates as sensing circuit for self capacitance measurement, according to one embodiment.

FIG. 3A illustrates one embodiment of a self capacitance measurement circuit 301. Self capacitance sensor 310 ($C_S$) may be formed between an electrode 110 as shown in FIG. 1A and ground. The non-grounded side of self capacitance sensor 310 may be coupled to a pin 312 of capacitance measurement circuit 301. A switch network 315 may be used to generate a current by alternately charging self capacitance sensor 310 to a voltage ($V_{DD}$) and discharging the accumulated charge onto an integration capacitor 322, which may be part of channel 320. The current from switch network 315 and self capacitance sensor 310 may be given by:

$$I = \frac{V}{R_{eq}}, \quad (3)$$

where the equivalent resistance of the switch network 315 and self capacitance sensor 310 is given by:

$$R_{eq} = \frac{1}{fC_S} \quad (4)$$

where $C_S$ is given by equation (2) and f is the switching frequency of switches SW1 and SW2. Switch network 315 and integration capacitor 322 may be coupled to an input of operational amplifier 324 with a reference voltage ($V_{REF}$) to allow step-wise linear charging of integration capacitor 322. The voltage across integration capacitor 322 may be measured by analog-to-digital converter (ADC) 326, the output of which may be analyzed by processing block 330. After the voltage across integration capacitor 322 by ADC 326, the voltage across integration capacitor 322 may be reset by switch SW3, allowing a new measurement.

Figure 3B:
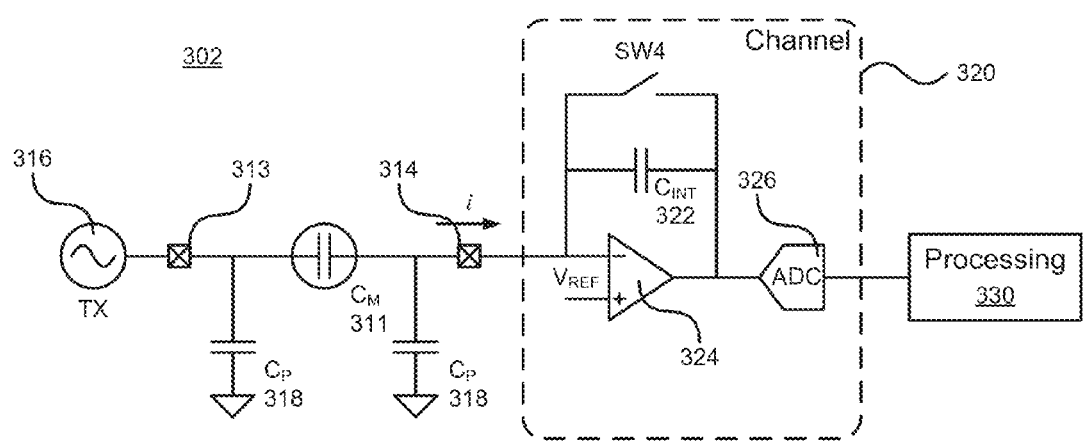
FIG. 3B illustrates as sensing circuit for mutual capacitance measurement, according to one embodiment.

FIG. 3B illustrates one embodiment of a mutual capacitance measurement circuit 302. Mutual capacitance sensor 311 ($C_M$) may be formed at the intersection of two electrodes (120 and 122 of FIG. 1B; 130 and 132 of FIG. 1C), which also have a parasitic capacitance 318 ($C_P$). Each plate of mutual capacitance sensor 311 may be coupled to a pin of mutual capacitance sensing circuit 302. A first pin 313 may be coupled to a signal generator (TX) 316 and a second pin 314 may be coupled to channel 320. The alternating voltage of signal generator 316 may produce a current from mutual capacitance sensor 311 to an integrating capacitor 322 of channel 320. In one embodiment, the voltage across integration capacitor 322 may be measured by ADC 326, the output of which may be analyzed by processing block 330. After the voltage across integration capacitor 322 by ADC 326, the voltage across integration capacitor 322 may be reset by switch SW4, allowing a new measurement. In another embodiment, the current from mutual capacitance sensor 311 may be used to bias an input of a self capacitance measurement circuit 301 similar to that shown in FIG. 3A. The bias provided by the mutual capacitance induced current may provide greater dynamic range of the combination of the integration capacitor 322 and ADC 326.

While channel 320 of FIGS. 3A and 3B are shown to comprise an operational amplifier (324) and an ADC (326), one of ordinary skill in the art would understand that there are many ways to measure a voltage on an integration circuit and that the embodiments of FIGS. 3A and 3B are intended as exemplary and not limiting. For example, ADC 326 may be replaced by a comparator and a counting mechanism gated by the output of the comparator to produce a digital representation of the capacitance on the integrating circuit. In this embodiment, the number of counts from the counting mechanism may represent the time required to charge the integrating circuit to a reference voltage of the comparator. Larger charging currents may produce faster charging of the integrating circuit and lower count values.

Capacitance measurement circuits such as those in shown in FIGS. 3A and 3B may implemented on an integrated circuit (IC) alone or with several instances of each to measure the capacitances of a plurality of inputs.

Figure 4A:
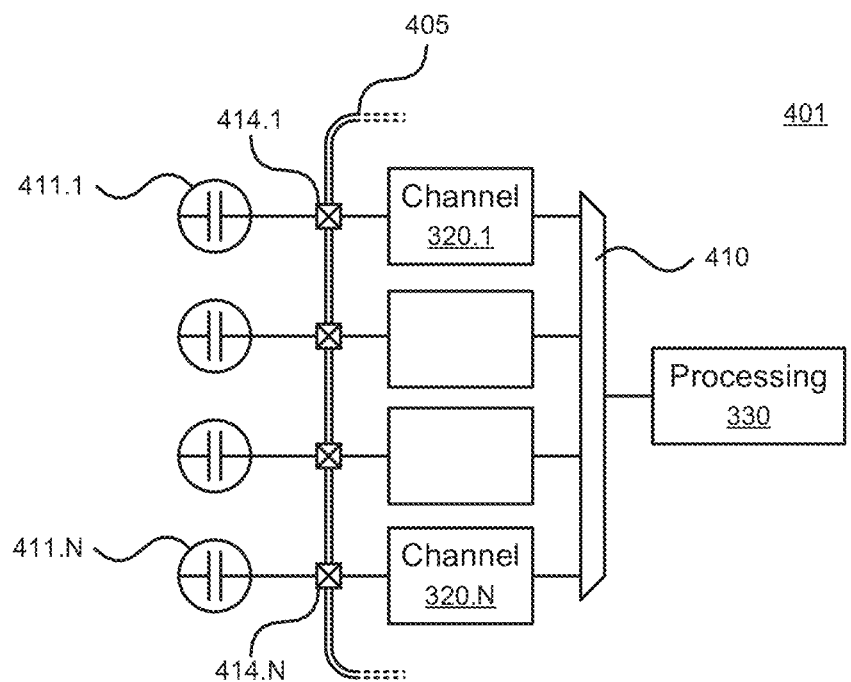
FIG. 4A illustrates connections between a plurality of sensing channels and a plurality of measurable capacitances, according to one embodiment.

FIG. 4A illustrates a circuit 401 for measuring multiple capacitances 411.1 through 411.N according to one embodiment. In circuit 401, four capacitances 411.1 through 411.N may be coupled to pins 414.1 through 414.N of sensing IC 405. Each mutual capacitance 411.1 through 411.N may be coupled to channels 320.1 through 320.N and the outputs of each of channels 320.1 through 320.N coupled to a processing block 330 through multiplexor 410.

Figure 4B:
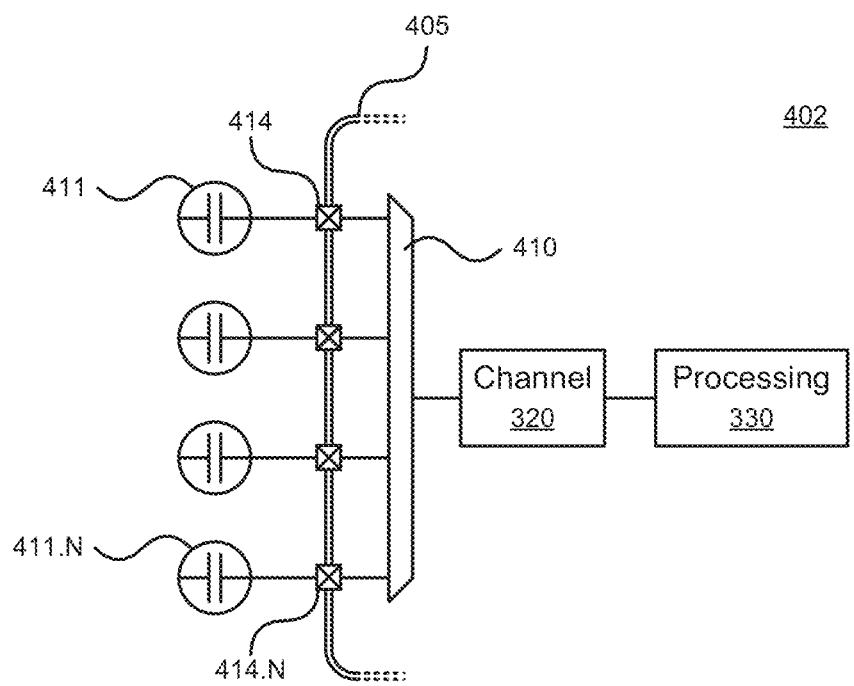
FIG. 4B illustrates connections between a single sensing channel and a plurality of measurable capacitances, according to one embodiment.

FIG. 4B illustrates a circuit 402 for measuring multiple capacitances 411.1 through 411.N according to another embodiment. In circuit 402, four capacitances 411.1 through 411.N may be coupled to pins 414.1 through 414.N of sensing IC 405. Each capacitance 411.1 through 411.N may be coupled to an input of multiplexor 410, the output of which may be coupled to channel 320. The output of channel 320 may be coupled to processing block 330.

FIGS. 4A and 4B illustrate the logical extremes of individual channels for each capacitance or a single channel for all capacitances. However, in another embodiment, different combinations of the circuits of FIGS. 4A and 4B may be implemented. For example, multiple channels 320 may be coupled to multiple capacitances 411. In one embodiment, the capacitances may be distributed evenly across all the available channels. In another embodiment, the capacitances may be distributed unevenly, with certain channels configured to measure capacitance on more pins than other channels. Additionally, while FIGS. 4A and 4B illustrate four capacitances, pins, or channels, one of ordinary skill in the art would understand that more or less than four of each may be used. Additionally, the number of capacitances, pins, and channels may be the same or they may be different, depending on the design requirements.

Capacitances 411.1 through 411.N may be coupled to signals opposite to pins 414.1 through 414.N to produce a current input to channel 320 representative of a measured capacitance as described in FIG. 3. In another embodiment, capacitances 411.1 through 411.N may be coupled to signals to produce a current used for calibration of circuits 401 and 402.

While FIGS. 4A and 4B illustrate a multiplexor, one of ordinary skill in the art would recognize that a plurality of switches may be configured to perform similar functionality as a multiplexor. The representation of the mechanism by which capacitances 411.1 through 411.N are coupled to channel 320 or how channels 320.1 through 320.N are coupled to processing block 330 by a multiplexor is merely exemplary and not intended to limit the description to a specific circuit element.

Processing

Figure 5:
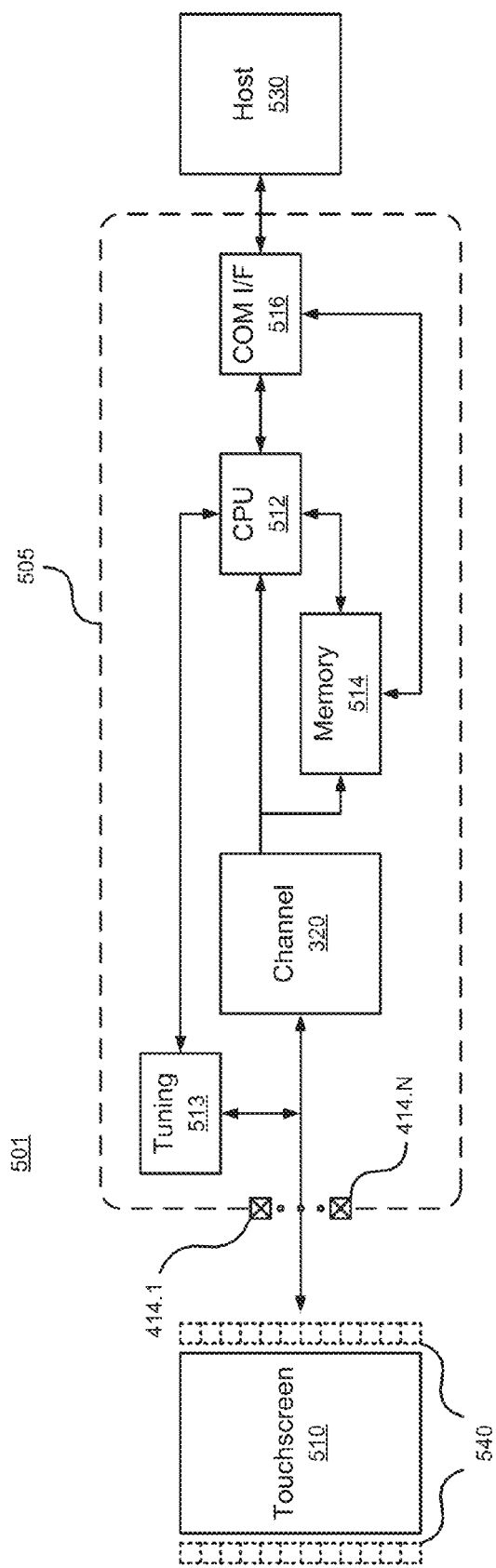
FIG. 5 illustrates a flow of information and control signals in a capacitance sensing system, according to one embodiment.

FIG. 5 illustrates one embodiment of a touchscreen system 501. A touchscreen 510 may be coupled to a sensing IC 505 though pins 414 (e.g., 312 in FIG. 3A, 313 and 314 in FIG. 3B, and 414 in FIGS. 4A and 4B). Sensing IC 505 may comprise a channel 320 coupled to the touchscreen electrodes of touchscreen 510 (illustrated in FIGS. 2A and 2B). In one embodiment, the output of channel 320 may be sent to CPU 512 for processing (as shown in FIGS. 3A and 3B) and then either communicated to a host 530 through communication interface 516 or stored in a memory 514 and communicated to host 530 through communication interface 516 from memory 514. In another embodiment, the output of channel 320 may be stored in memory 514 directly (before processing by CPU 512) and either processed by CPU 512 from memory 514 and then communicated to host 530 through communication interface 516 or communicated to host 530 from memory 514 through communication interface 516 without CPU intervention. Tuning and calibration routines may be stored in memory 514 and implemented by CPU 512 through tuning block 513. Calibration of signals from touchscreen 510 through and by channel 320 may provide capacitance measurement data with greater signal-to-noise ratios and fidelity to user interactions.

Capacitance measurement data from channel 320 may be representative of the total capacitance measured by channel 320. That is, the capacitance of self or mutual capacitances of FIGS. 1A through 1C may be converted to a digital value. The digital value may include the parasitic capacitance (318 of FIGS. 3A and 3B) as well as the native mutual capacitance with no figure present (311 of FIG. 3B) and the capacitance of the conductive object or finger. The parasitic capacitance and native mutual capacitance may be subtracted from the measured value as a baseline to yield difference values that are representative of the capacitance from the conductive object or finger. Difference values may be analyzed by processing block 330 to determine if a conductive object is proximate to the array as well as higher-level user interactions.

CPU 512 or host 530 may further use capacitance and/or difference values to detect the activation of one or more virtual sensors 540 along the edges of touchscreen 510. The activation of virtual sensors may be used to determine user interactions not specifically designated for the touchscreen.

Figure 6C:
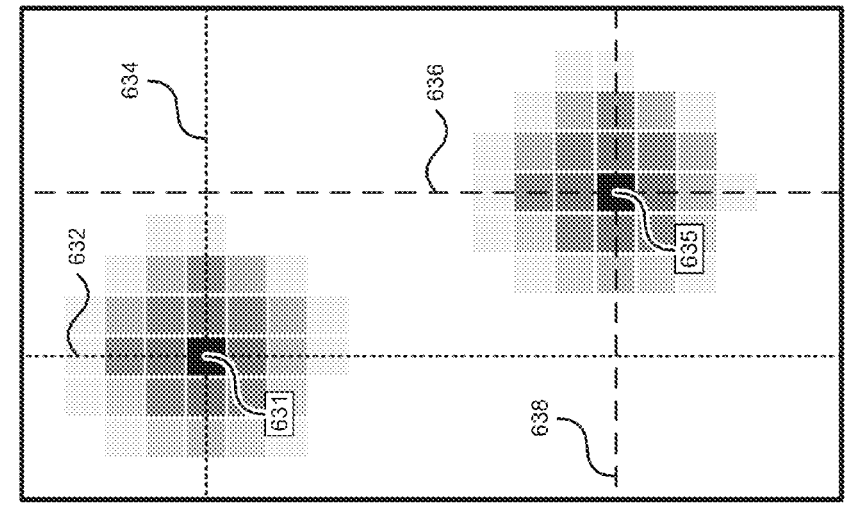
FIG. 6C illustrates a plurality of detected peaks on a capacitance sensing array, according to one embodiment.
Figure 6B:
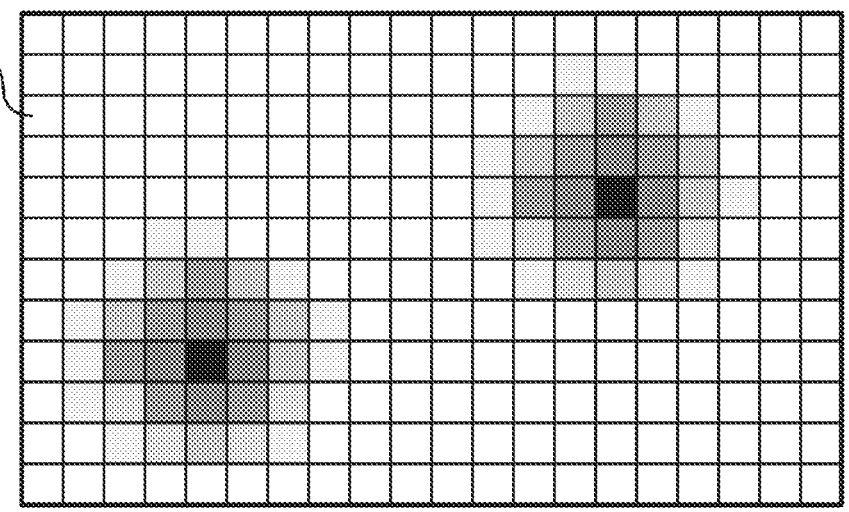
FIG. 6B illustrates measured changes in capacitance graphically on an capacitance sensing array, according to one embodiment.
Figure 6A:
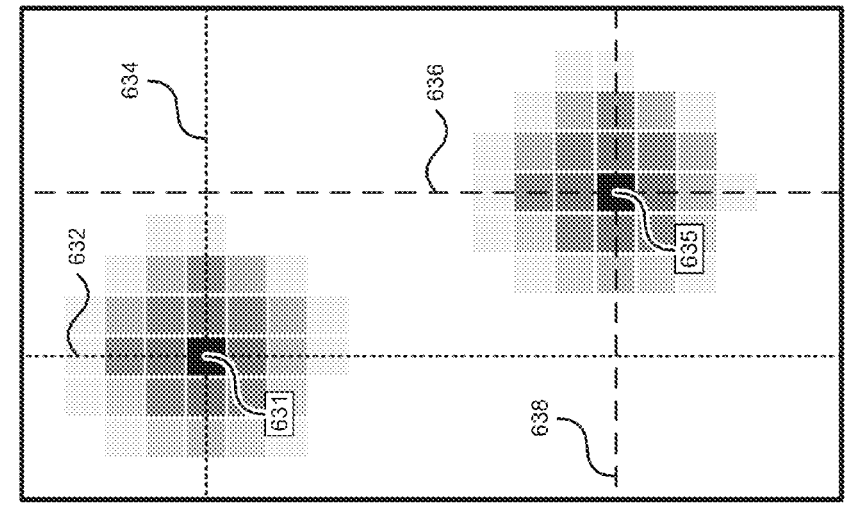
FIG. 6A illustrates measured changes in capacitance numerically on an capacitance sensing array, according to one embodiment.

FIG. 6A illustrates numerical difference values 601 for a plurality of intersections 611 of a mutual capacitance sensing array. Numerical difference values 601 may be derived from the raw values of, for example, channel 320 (FIG. 3B) for every unit cell (229 of FIGS. 2A and 239 of FIG. 2B) or mutual capacitance, $C_M$, 311 (FIG. 3B). In one embodiment, numerical difference values may be the difference between the raw count values output from channel 320 and a baseline value. In one embodiment, the baseline value may be stored globally for the entire array. In another embodiment, the baseline value may be stored for each intersection individually. In another embodiment, the baseline value may be stored for multiple groups of sensors depending on each sensor's position on the touchscreen, noise performance of individual sensors, other design restraints. Baseline values may be determined during development in one embodiment. In another embodiment, baseline values may be calculated at start-up or may be updated during operation of the touchscreen to account for variations in noise experienced by the touchscreen electrodes, physical changes on the touchscreen (heat, humidity, etc.), or other sources of drift in the output channel (e.g., channel 320).

The numerical difference values 601 of FIG. 6A may be illustrated graphically as heat map 602 in FIG. 6B. The shade of each cell or mutual capacitance 601 of heat map 602 may indicate of the numerical difference values 601 of FIG. 6A. Darker cells may indicate of greater capacitive coupling of a mutual capacitance electrode with a conductive object and less capacitive coupling between the mutual capacitance electrodes themselves. For clarity of description, the representation illustrated in FIG. 6B is used for subsequent figures.

FIG. 6C illustrates an example of peak detection scheme 603 based on the data from FIGS. 6A and 6B. The peak detection scheme 603 may compare each unit cell (229 of FIGS. 2A and 239 of FIG. 2B) or mutual capacitance 611 (FIGS. 6A and 6B) to those around it. Unit cells or mutual capacitances with the highest different value may be identified as peaks and given an identifier and position. A first peak 631 may be given a first position (X-axis 632 and Y-axis 634). A second peak 635 may be given a second position (X-axis 636 and Y-axis 638). In cases where peak sensors 631 and 625 are located at the edge of the array, virtual sensors may be activated as shown in FIGS. 11 and 16.

Figure 6F:
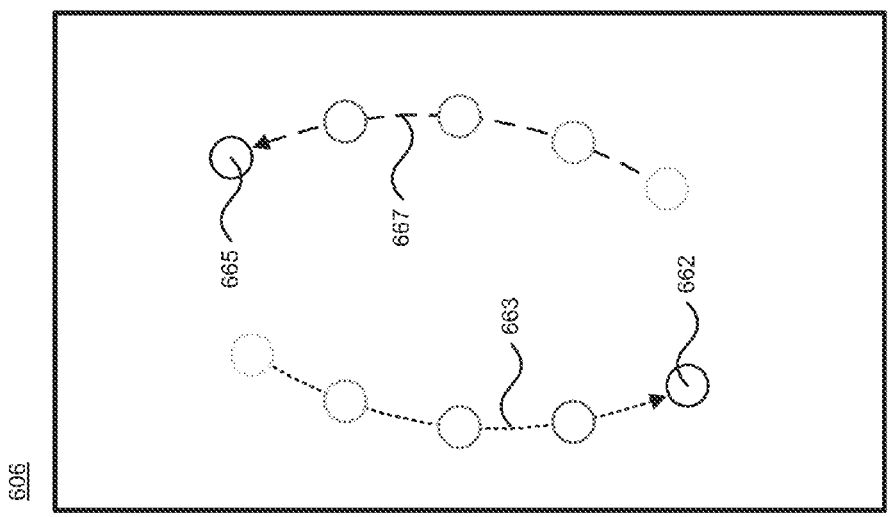
FIG. 6F illustrates a representation of tracking a plurality of conductive objects moving across a capacitance sensing array.
Figure 6E:
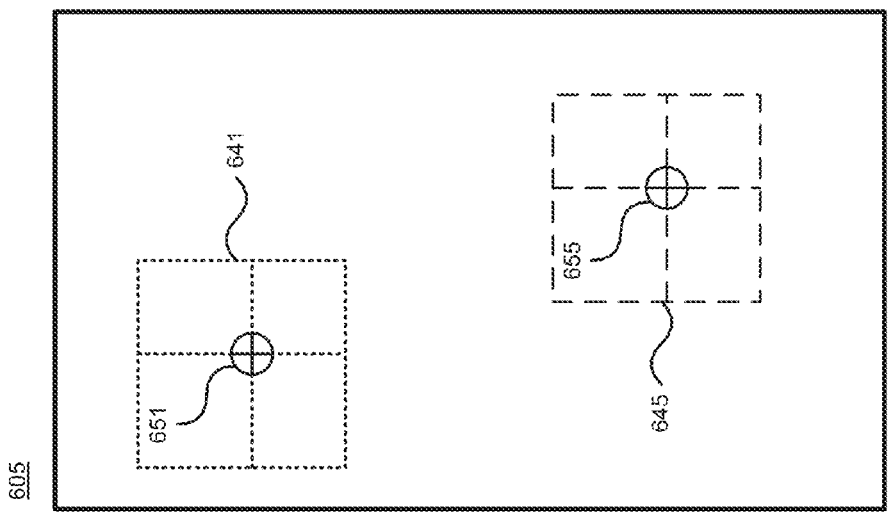
FIG. 6E illustrates the result of a centroid calculation with a 5×5 window of sensors for two conductive objects, according to one embodiment.
Figure 6D:
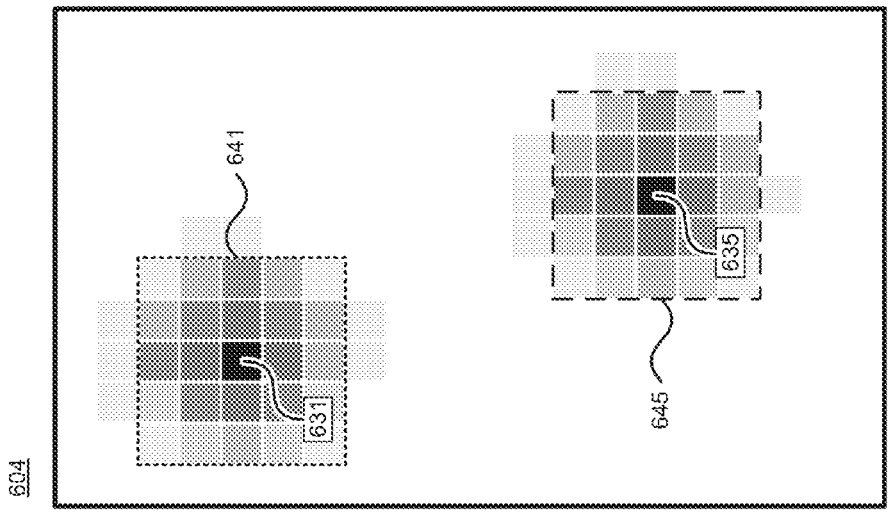
FIG. 6D illustrates a centroid calculation with a 5×5 window of sensors, according to one embodiment.

FIG. 6D illustrates an example of centroid calculation 604 wherein an array of sensors surrounding each peak is defined and processed. First peak 631 may be used to define a first array 641 including the 25 unit cells around and including the unit cell at first peak 631. Second peak 635 may be used to define a second array 645 including the 25 unit cells around and including peak 631. The values of first array 641 and second array 645 may be processed to find the centroid or center of mass of the conductive object based on the values contained within each array (641 and 645). While symmetrical 5×5 arrays are illustrated in and describe with regard to FIG. 6D, in various embodiments, the arrays may have different dimensions and consequently different numbers of unit cells. Such various embodiments may include 3×3, 4×4, or larger arrays. The arrays may position peaks in the center or the peaks may be offset. Additionally, the arrays may be asymmetrical, with a greater number of rows or columns, or irregular, where each row or column may have a different number of unit cells.

FIG. 6E illustrates an example of the first and second centroids 651 and 655 calculated from first and second arrays 641 and 645 of FIG. 6D, when no virtual sensors are determined activated.

FIG. 6F illustrates an example of two conductive objects 661 and 665 moving across a touchscreen and their positions along tracks 663 and 667, respectively.

FIG. 7A illustrates one embodiment of a touchscreen stackup of touchscreen system 501 (from FIG. 5). Touchscreen stackup 701 may include a display 740. Above display 740 may be disposed a sensor layer 750. Between sensor layer 750 and a conductive object, such as a finger, may be disposed a cover layer 760.

While sensor layer 750 is shown to be on the same layer of a substrate, this is merely exemplary. In one embodiment, sensor layer 750 may be disposed on the bottom of cover layer 760, reducing the number of layers from three to two in touchscreen stackup 701. In another embodiment, sensor layer 750 may be disposed on the top of display 740, also removing a layer from touchscreen stackup 701. In another embodiment one or both axes of the electrodes shown on sensor layer 750 may be disposed at various depths within the display. For example, sensor layer 750 may implemented as in-cell, on-cell, or a hybrid of in-cell and on-cell. Additionally, sensor layer 750 may share certain electrodes with display 740.

Using the electrodes on sensor layer 750, activation of virtual sensors 765 may be determined. In one embodiment, virtual sensors 765 may be represented as activation areas on a plane substantially perpendicular to the plane on which electrodes are disposed (sensor layer 750).

Touchscreen stackup 701 is illustrated in a touchscreen system 702 in FIG. 7B, according to one embodiment. Touchscreen/display 705 (analogous to touchscreen stackup 701 of FIG. 7A) may be coupled to touch controller 710 and display controller/driver 715. Touch controller 710 may be configured to sense either self capacitance (FIG. 3A) or mutual capacitance (FIG. 3B) or both. The output of the touch controller 710 may be communicated to an application processor 730. Touch controller 710 may also be configured to receive commands and data from application processor 730. Information that may be communicated to application processor 730 by touch controller 710 may include the following data for each identified conductive object on the array:

Age of Detection—How long (in number of scans) a touch has been present on the touchscreen;

X-Axis Position—The position along the horizontal axis of the conductive object on the array;

Y-Axis Position—The position along the vertical axis of the conductive object on the array;

Z-Axis Intensity—The strength of the touch which may be indicative of the size of the conductive object or the pressure with which the conductive object presses against the touch surface;

Contact Area Major Axis Length—The long axis of an ellipse centered on the location of the conductive object on the array;

Contact Area Minor Axis Length—The short axis of an ellipse centered on the location of the conductive object on the array;

Contact Area Major Axis Angle—The angle (from vertical) of the long axis of an ellipse centered on the location of the conductive object on the array;

Touchdown/Liftoff Debounce—Whether there is debounce (or hysteresis) for the detection of the conductive object on the array and whether/where the detection is within the debounce;

Conductive Object Identification—The type of touch (bare finger, gloved finger, stylus, hover, proximity, etc.);

Conductive Object Size—Large conductive object or a regular-sized conductive object;

Virtual Sensor Activation State—identify, location, and signal level of various active virtual sensors; and Gestures (discussed in more detail with regard to FIGS. 8A through 8G).

Application processor 730 may also be coupled to display controller/driver 715 to control what is shown on touchscreen/display 705.

Figure 8A:
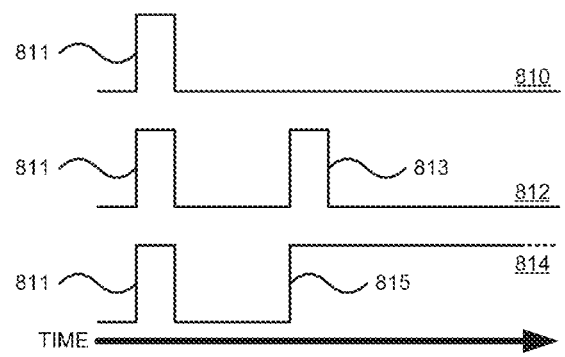
FIG. 8A illustrates contact timing diagrams for tap, double-tap, and click-and-drag gestures, according to one embodiment.
Figure 8B:
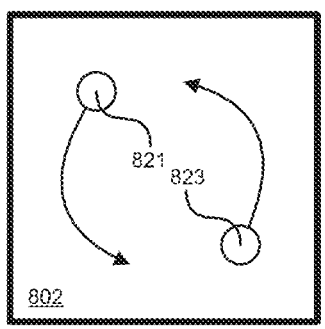
FIG. 8B illustrates a plurality of conductive objects moving across a capacitance sensing array to produce a "rotate" gesture, according to one embodiment.
Figure 8C:
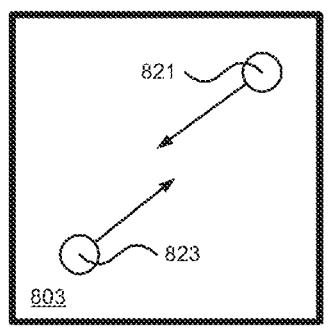
FIG. 8C illustrates a plurality of conductive objects moving across a capacitance sensing array to produce a "pinch" or "zoom-out" gesture, according to one embodiment.
Figure 8D:
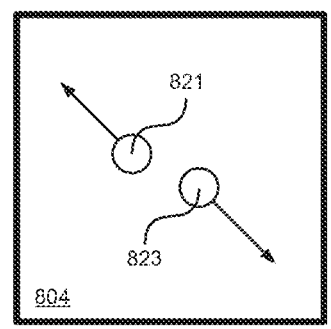
FIG. 8D illustrates a plurality of conductive objects moving across a capacitance sensing array to produce a "grow" or "zoom-in" gesture, according to one embodiment.
Figure 8E:
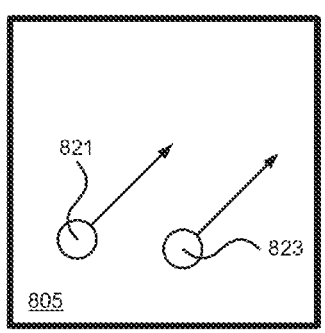
FIG. 8E illustrates a plurality of conductive objects moving across a capacitance sensing array to produce a "pan" gesture, according to one embodiment.

FIG. 8A illustrates examples of capacitance measurement data for a single conductive object as might be interpreted to be single-touch gestures. A detection of a conductive object in FIG. 8A is illustrated as a digital ON/OFF or HIGH/LOW of the conductive object on the capacitance sensor. A single-tap gesture 810 may be detected as a presence of a conductive object detected and then the absence of a conductive object detected to define first touch 811. A double-tap gesture 812 may be detected as a presence of a conductive object detected and then the absence of a conductive object detected to define a first touch 811, then within a specified time a second touch 813 detected. A click-and-drag gesture 814 may be detected as a presence of a conductive object detected and then the absence of a conductive object detected to define a first touch 811, then within a specific time a second touch 815 detected. A click-and-drag gesture may also move a cursor on a display as the second touch remains on the touch surface and moves across the surface.

FIGS. 8B through 8E illustrate examples of gestures based on detection of two conductive objects. In one embodiment, conductive objects 821 and 823 may move in a circular motion about some center point, either clockwise or counterclockwise to produce a rotate gesture 802. In another embodiment, conductive objects 821 and 823 may move closer together along a substantially linear path to produce a "pinch" or "zoom out" gesture 803. In another embodiment, conductive objects 821 and 823 may move farther apart along a substantially linear path to produce a "grow" or "zoom in" gesture 804. In another embodiment, conductive objects 821 and 823 may move along substantially parallel paths to produce a "pan" gesture 805.

Figure 8F:
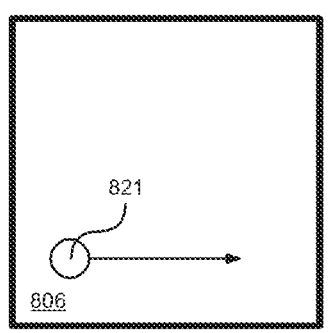
FIG. 8F illustrates a conductive object moving across a capacitance sensing array to produce a "next item" or "next page" gesture, according to one embodiment.
Figure 8G:
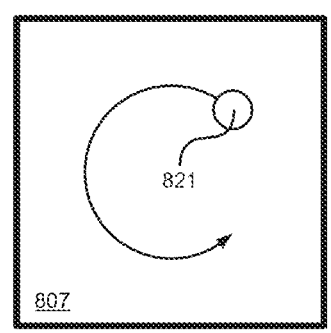
FIG. 8G illustrates a conductive object moving across a capacitance sensing array to produce a "scroll" gesture, according to one embodiment.

FIGS. 8F and 8G illustrate gestures based on detection of a single contact moving across a capacitance sensing array. In one embodiment, conductive object 821 may move in a substantially straight line to produce a "next item" gesture 806. In another embodiment, conductive object 821 may move in a circular motion about some center point, either clockwise or counter-clockwise to produce a scroll gesture 807.

Figure 18:
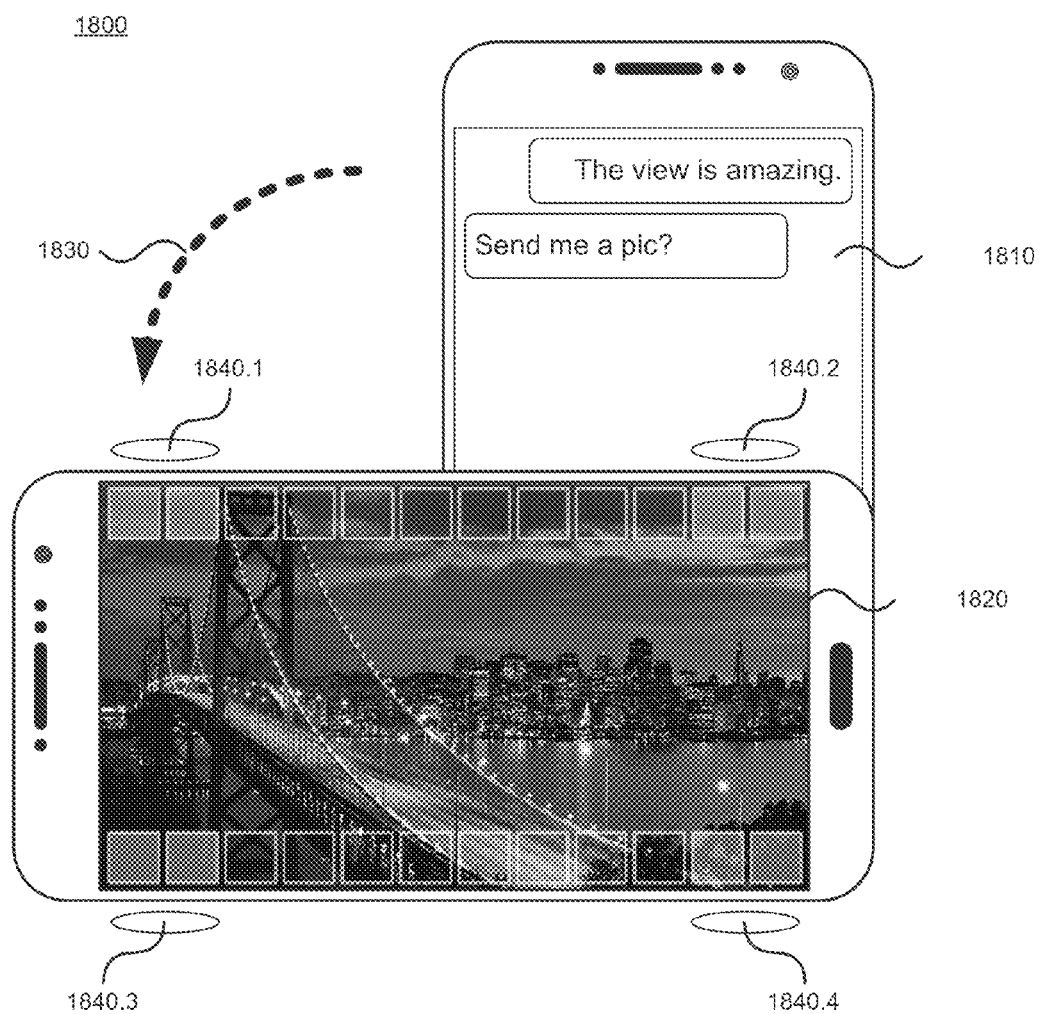
FIG. 18 illustrates a representation of a mode change of a touchscreen device based, in part, on activation of at least virtual sensor, according to one embodiment.
Figure 19:
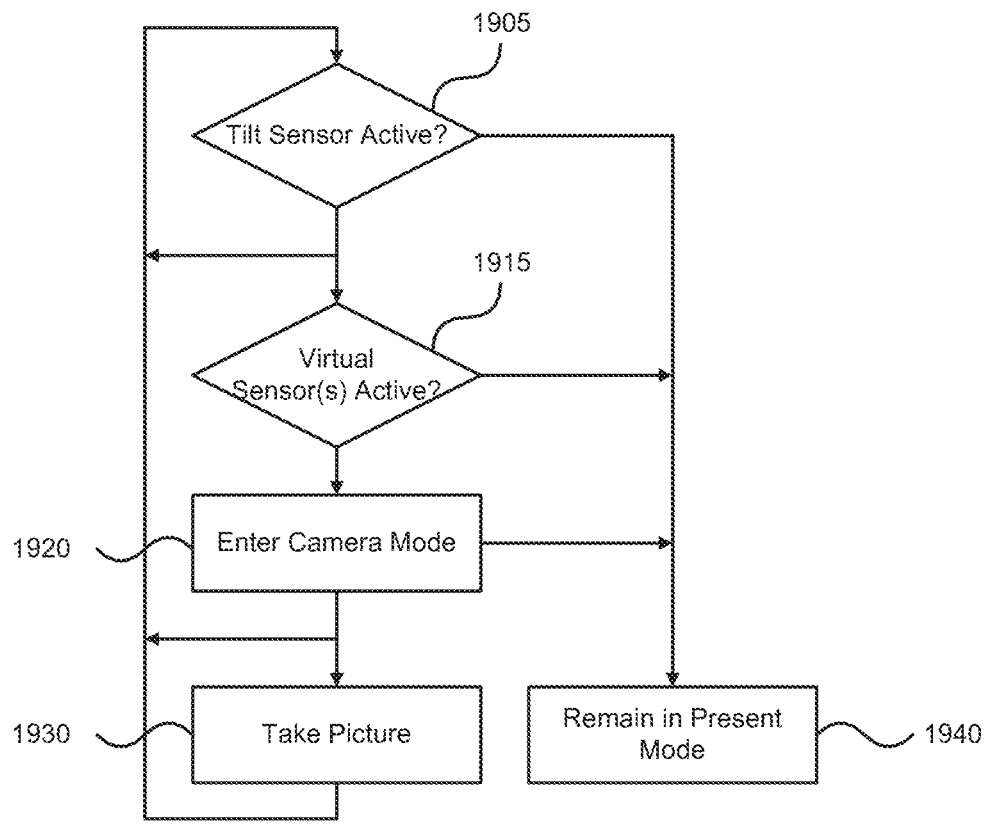
FIG. 19 illustrates a method for determining a mode change with virtual sensors, according to one embodiment.

Gestures of FIGS. 8A and 8C-8F may be detected on virtual sensors to achieve additional functionality without a user contacting the touchscreen directly. In various embodiments, tap, double-tap, and scroll/pan may be used to control various interfaces, such as a camera (FIGS. 18-20).

Figure 9:
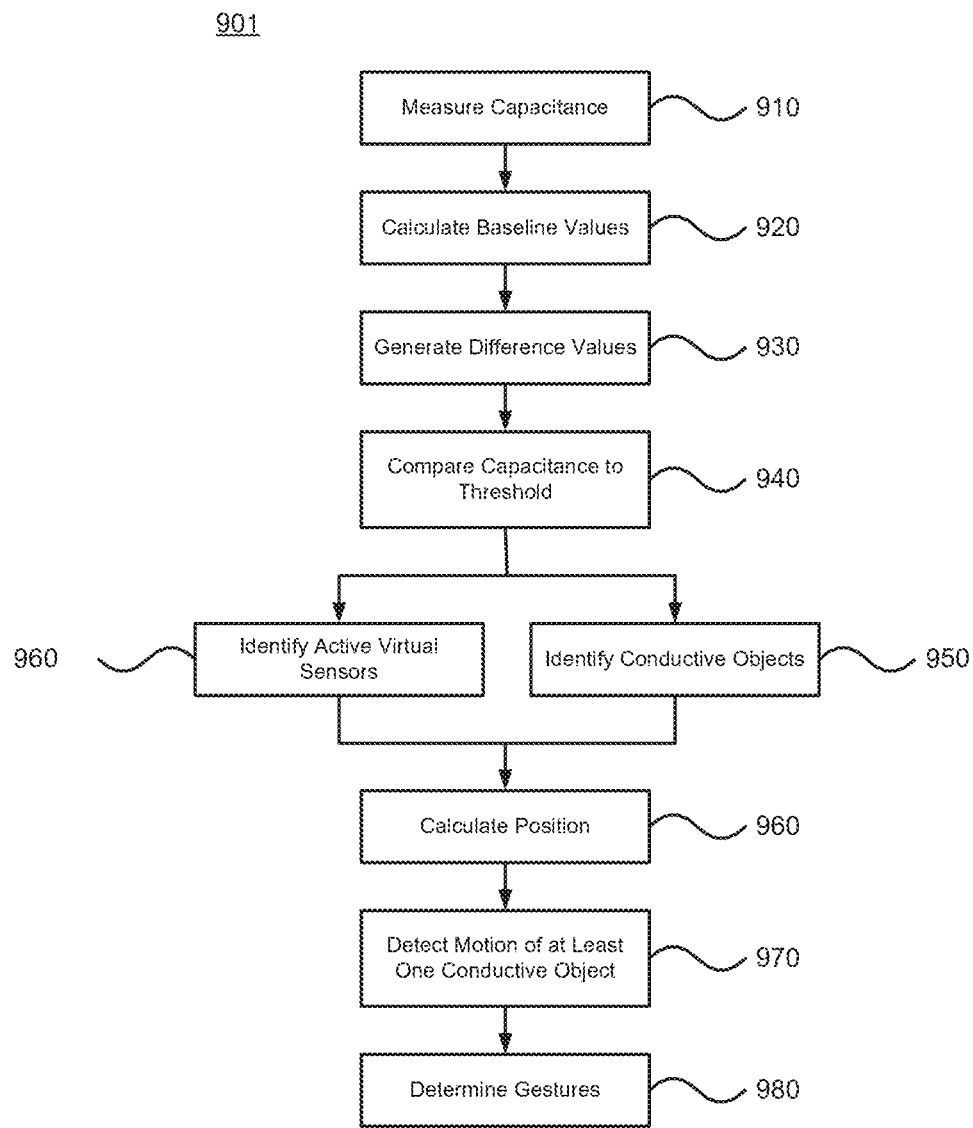
FIG. 9 illustrates a method for measuring capacitance on a touchscreen and outputting a result, according to one embodiment.

FIG. 9 illustrates one embodiment of a method 901 of sensing a touchscreen array and determining the appropriate display. Capacitance is first measured in step 910. Step 910 may correspond to self capacitance measurement or mutual capacitance measurement and may use sensing circuits similar to those described in FIG. 3A or 3B. In other embodiments, other self or mutual capacitance sensing methods may be used. Raw capacitance values may be used to create a baseline in step 920. Baseline values may then be subtracted from the raw capacitance values in step 930 to generate difference values (as shown in FIG. 6A). In one embodiment, difference values may be used to determine calibration parameters for hardware configuration. Calibration parameters may include coupling various unit cells (e.g. 229 and 239 of FIGS. 2A and 2B, respectively) to drive signals such that bias currents are provided to the digital conversion of a measurable capacitance (e.g. FIG. 10, below). Difference values from step 930 may compared to threshold values in step 940 to determine if a conductive object is present on the array sufficient enough to process. If the difference values are above the threshold values, conductive objects are detected in step 950. In one embodiment, the detection of conductive objects may be by identifying peaks as illustrated in FIG. 6C. If peaks are identified at the edge of the array, virtual sensors may be determined active in step 960. Alternatively, the position of each conductive object on the array may be calculated in step 970 from the capacitance values. In one embodiment, position may be calculated as described with regard to FIGS. 6D and 6E. The position of each conductive object on the array may be tracked over time to detect motion (or lack thereof) of each conductive object in step 980, as illustrated in FIG. 6F. Finally, the presence, absence, and position of each conductive object may be monitored and used to detect gestures in block 990 as illustrated in FIGS. 8A through 8G.

In one embodiment, the entire method 901 of FIG. 9 may be completed by touch controller 710 of FIG. 7. In another embodiment, various steps of method 901 may be completed by an external processor such as application processor 730 of FIG. 7. In this embodiment, data may be communicated to and from touch controller 710 through communication interface 516 of FIG. 5. Information communicated to the host may be stored in a memory (such as memory 514) or communicated through a processing unit (such as CPU 512). In another embodiment, additional processing steps may be completed by touch controller 710 or application processor 730 and the results of those steps used in performing the steps of method 901 illustrated in FIG. 9.

Virtual Sensors

In various embodiments, subsets of electrodes or unit cells may be used to create virtual buttons outside of or on the edge of the sensing area defined by the display and the sensor layer 750. For a self capacitance touchscreen, electrodes disposed along the periphery of the display and sensor layer may be used to detect a finger or other conductive element on the side of the device. FIG. 10A illustrates an array of electrodes 1001 with diamond-shaped elements similar to that shown in FIG. 2A. The top row 1014 and bottom row 1016 and the left column 1010 and right column 1012 of diamond-shaped elements may be used to detect a user's fingers along the side of a touchscreen device. If rows or columns in the center (1015 or 1011, respectively) detect the presence of a conductive object, such as the user's finger, the position of that object may be determined.

Figure 10B:
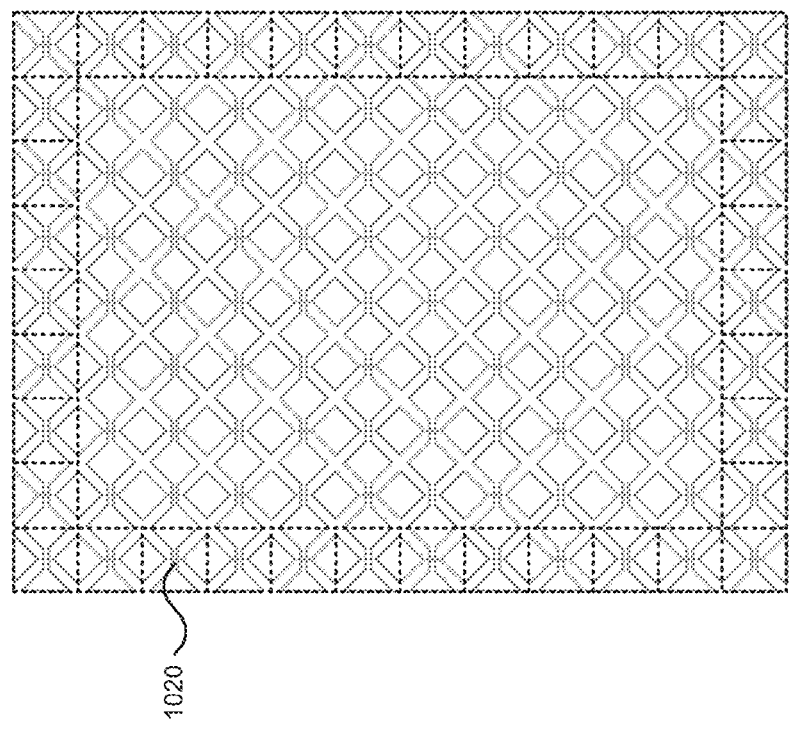
FIG. 10B illustrates a mutual capacitance sensing array of diamond-shaped sense elements with edge-identified unit cells, according to one embodiment.
Figure 10A:
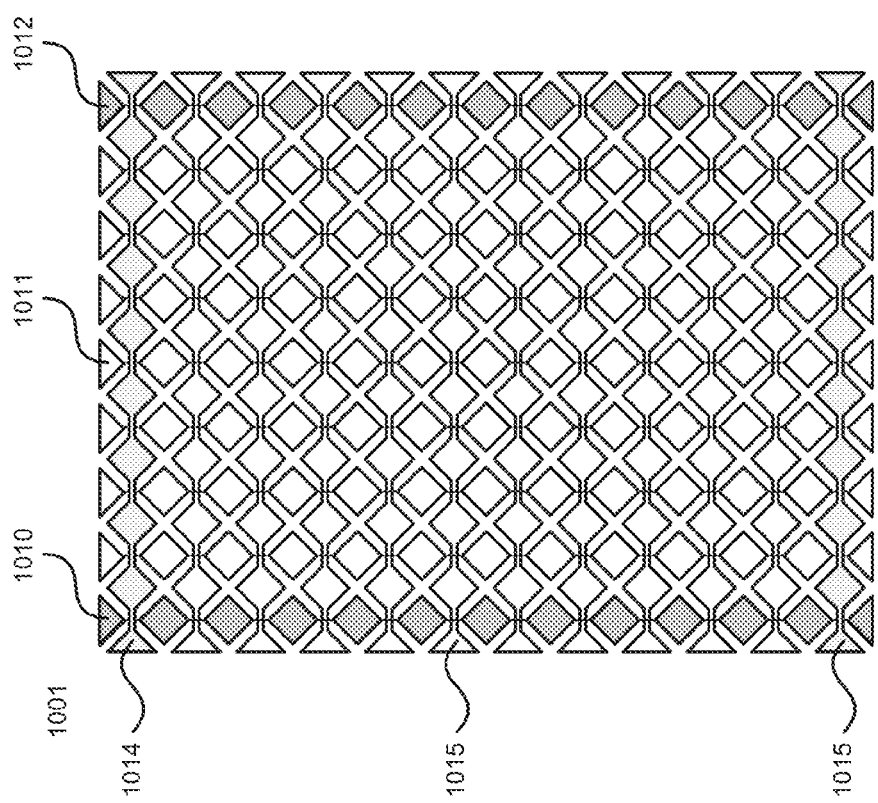
FIG. 10A illustrates a self capacitance sensing array with integrated edge electrodes comprising diamond-shaped sense elements, according to one embodiment.

FIG. 10B illustrates an array of electrodes 1002 with diamond-shaped sensor elements as shown in FIG. 10A, except that each of the electrodes is configured to measure a mutual capacitance between the top and bottom rows and each column of diamond-shaped elements and between the left and right columns and each row of diamond shaped elements. The mutual capacitance of each intersection may be interpreted as corresponding to a unit cell 1020 defined by that intersection. The measured mutual capacitance of the unit cell (or intersection) may then be used to detect the user's finger or hand along the side of the touchscreen device or along the edge of the display or measurement area.

Figure 10C:
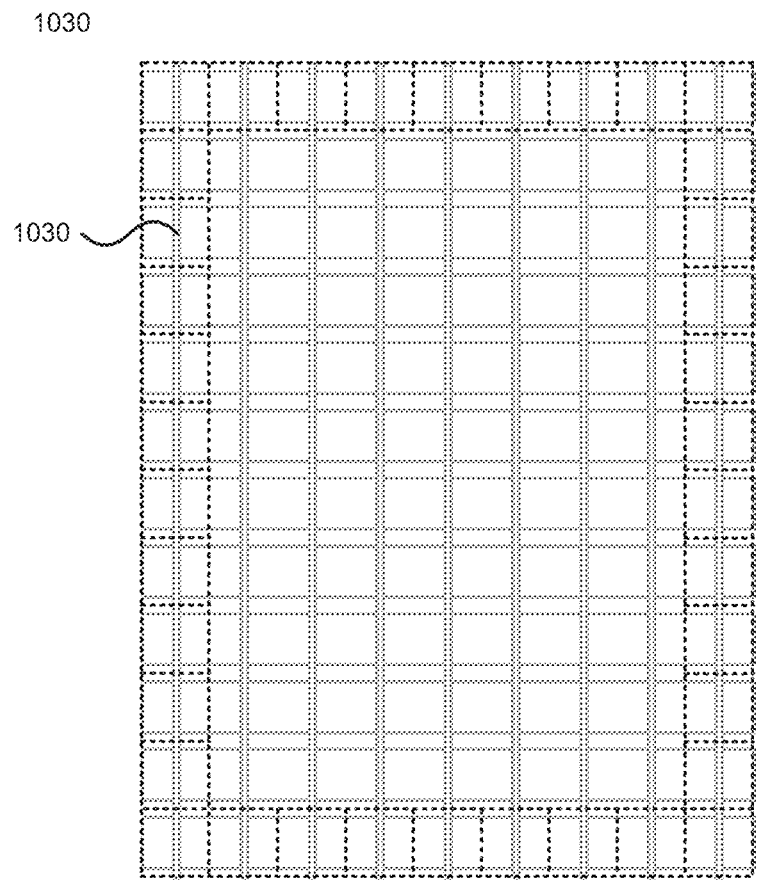
FIG. 10C illustrates a mutual capacitance sensing array of bar-shaped sense elements with edge-identified unit cells, according to one embodiment.

10C illustrates an array of bar-shaped electrodes 1003 similar to those shown in FIG. 2B. Just as with FIG. 10B, the mutual capacitance between the top and bottom electrodes and each column electrodes and between the left and right electrodes and each row electrode is measured. The mutual capacitance of each intersection may be interpreted as corresponding to a unit cell 1020 defined by that intersection. The measured mutual capacitance of the unit cell (or intersection) may then be used to detect the user's finger or hand along the side of the touchscreen device or along the edge of the display or measurement area FIG. 11 illustrates one embodiment of an array 1100 with virtual sensors around the periphery of the array. The values assigned to the virtual sensors may correspond to a capacitance measured on an adjacent row or column. For the purposes of demonstration, a mutual capacitance unit cell 1030, like those in FIG. 10C is shown. The virtual sensors may be assigned to groups corresponding to an axis and a side of the touchscreen device. A first group 1110 of virtual sensors 1112.1-1112.N may correspond to the left vertical edge. A second group 1120 of virtual sensors 1122.1-1122.N may correspond to the right vertical edge. A third group 1130 of virtual sensors 1132.1-1132.N may correspond to the top horizontal edge. A fourth group 1140 of virtual sensors 1142.1-1142.N may correspond to the bottom horizontal edge. The values of each of the sensors or unit cells (1030 from FIG. 10C, for example) along the periphery of the array may be used to assign values to each of the virtual sensors. See FIG. 16 below for a description of a method for assigning values to virtual sensors for a mutual capacitance touchscreen, according to one embodiment. For a self capacitance array, the value assigned to the virtual sensor may be for the row or column touched by a finger and on the same side as the column or row that is active. That is, if the left sensor is active, the virtual sensor corresponding to an active row on the left side of the display may be assigned the value of the active row. Likewise, the same value may be assigned to the virtual sensor on the right side of the display if the right sensor is active. See FIG. 15 below for a description of a method for assigning values to virtual sensors for a self capacitance touchscreen, according to one embodiment.

Figure 12:
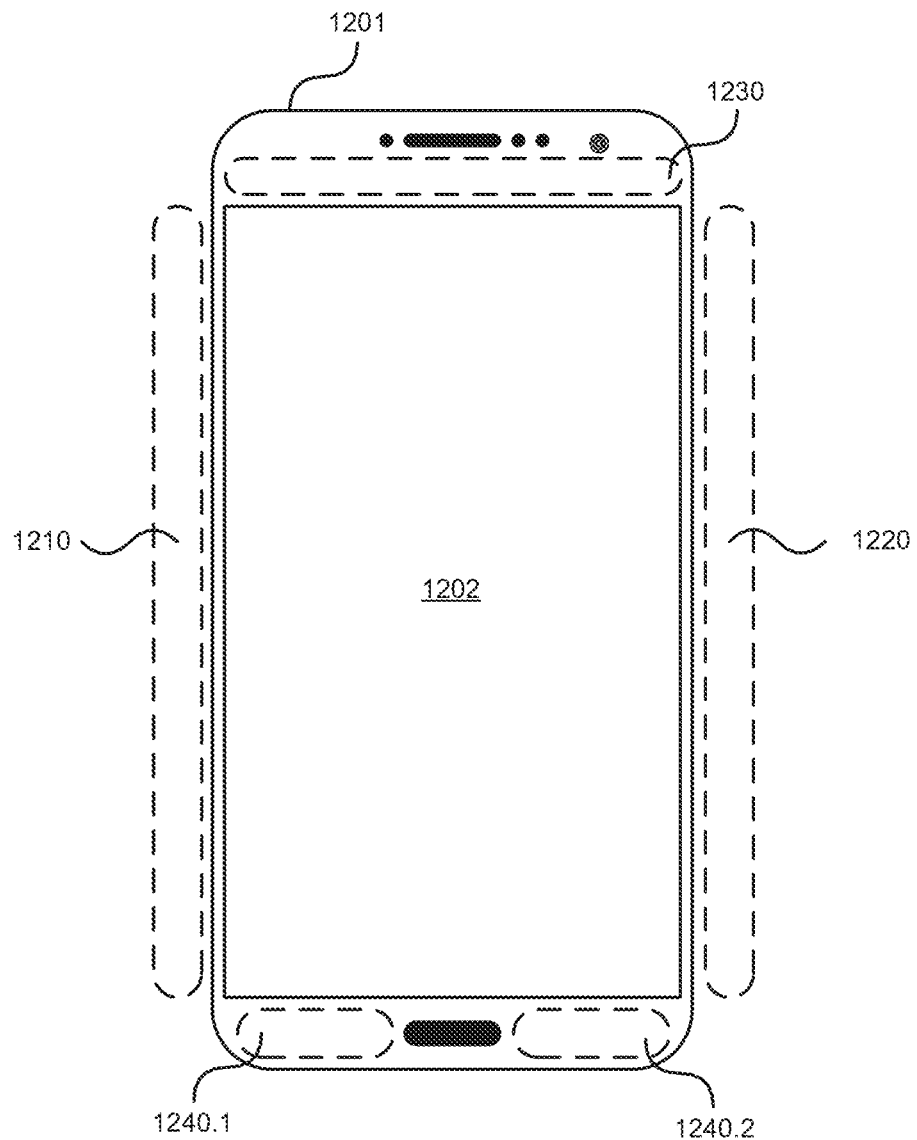
FIG. 12 illustrates a represent of locations of virtual sensors on a touchscreen device, according to one embodiment.

FIG. 12 illustrates one embodiment of how the virtual sensors of FIG. 11 may be used on an actual device, such as a mobile handset 1201. Virtual sensors may be assigned to a first group 1210 along the left side of the device or a second group 1220 along the right side of the device, provided that there is a sufficiently small distance between the edge of the sensing array and the edge of the device. Virtual sensors may also be assigned to the sensing surface of the device in areas where there is too much distance between the edge of the array and the edge of the device. For example, a first group of virtual sensors may be defined long the top of the display area 1202 in a third group 1230 or along the bottom of the display area in at least one fourth group 1240.1 or 1240.2. In such a configuration, the sensitivity of the sensing array may be extended beyond the area of the display to achieve additional functionality, such as the replacement of mechanical buttons or touch-sensitive buttons that are usually implemented as separate inputs.

Figure 13A:
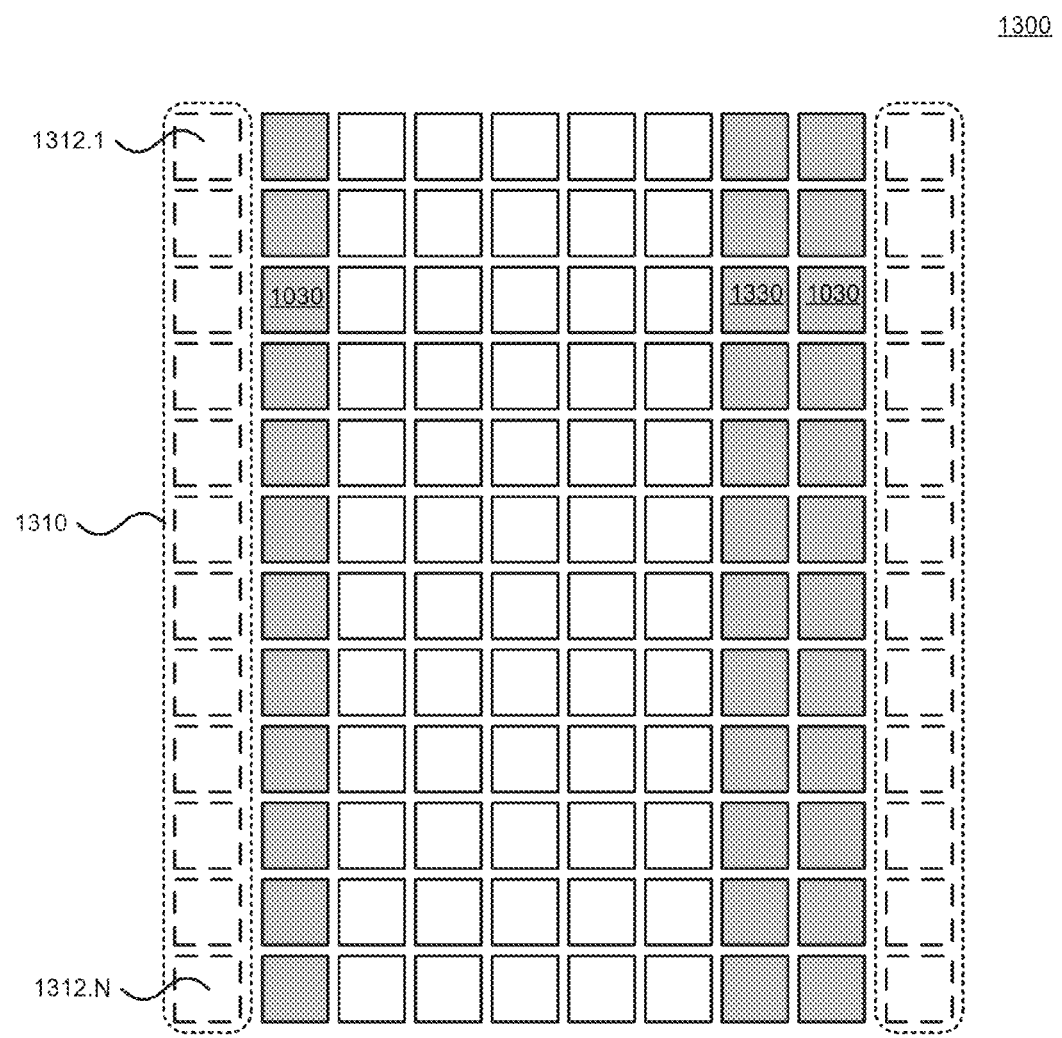
FIG. 13A illustrates an array of unit cells and virtual sensors with varying corresponding unit cells, according to one embodiment.

FIG. 13A illustrates an embodiment of an array 1301 with virtual sensors on either side of the array. In the embodiment of FIG. 13, the values from more than one column of unit cells (1330.7 and 1330.8) may be used to provide the capacitance values for the virtual sensors. That is, activation of multiple columns of unit cells may still yield the population of values for a virtual sensors and the activation of a button or other interface element associated therewith as well as a position of a contact on the screen itself. In an alternate embodiment, the position of a contact on the screen itself is not determined if a virtual sensor is populated. For a self capacitance array (see FIG. 10A), multiple columns or rows may be used to determine that a finger is at the edge of the array. That is, more than one row or column may have a value above a threshold and the controller may still recognized a touch on the edge of the device rather than a touch on the display area. For a mutual capacitance array (See FIGS. 10B and 10C), unit cells closer to the center of the array may be used. The decision to use a single row or column or multiple rows or columns may be context dependent and may change as certain functions of the device are activated. Furthermore, as shown in FIG. 13, different sides of a touchscreen display do not have to use the same number of electrodes or unit cells. In one embodiment, the number of columns on one side of the touchscreen device may be twice that as the other side. Such a configuration may depend on how a user may interact with the device or what is displayed on the touchscreen.

FIG. 13B illustrates an embodiment of an array of unit cells 1301 similar to those illustrated in FIGS. 11 and 13A. Each of the unit cells of the array of unit cells 1301 is has a capacitance change value. The capacitance change value may be calculated according to the measurement circuit 302 of FIG. 3B and processed similar in a manner similar to FIGS. 6A-F. The array of unit cells 1301 is shown in two halves, 1351 and 1355. Half 1350 illustrates capacitance change values indicative of a conductive object hovering above the array of unit cells 1301. Half 1355 illustrates capacitance change values indicative of two conductive objects in close proximity to the sensors along the edge of the touchscreen device. Half 1350 may have a single peak sensor 1351, shown to have a capacitance change value of 54. Half 1355 may have two peak sensors, 1356 and 1357, with capacitance change values of 123 and 90, respectively. While two peak sensors are illustrated for half 1355, one or ordinary skill in the art would understand that more or less than two peak sensors may actually be detected. A single peak sensor may be detected in one embodiment. In another embodiment, three or more peak sensors may be detected.

FIG. 13C illustrates an array of unit cells 1302, similar to the array of unit cells 1301 from FIG. 13B, wherein only the unit cells corresponding to the rows of the peak sensors (1351, 1356, and 1357 of FIG. 13B) are illustrated. The unit cells of the array of unit cells closest to the vertical edges of the array of unit cells may be identified as outer edge unit cells (1361). The unit cells that are immediately adjacent to the outer edge unit cells 1361 may be identified as middle edge unit cells 1363. The unit cells that are opposite the outer edge unit cells along the middle edge unit cells may be identified as inner edge unit cells 1365. Unit cells in the various groups of unit cells, outer, middle, and inner, may be used to detect a grip contact versus a hover contact by comparing those values in various embodiments. Once a grip contact has been detected, the values of the virtual sensors may be populated and decisions made with regard to user interaction. Embodiments of how to detect a grip or edge contact are discussed below with regard to FIGS. 15, 16A, and 16B.

Figure 14:
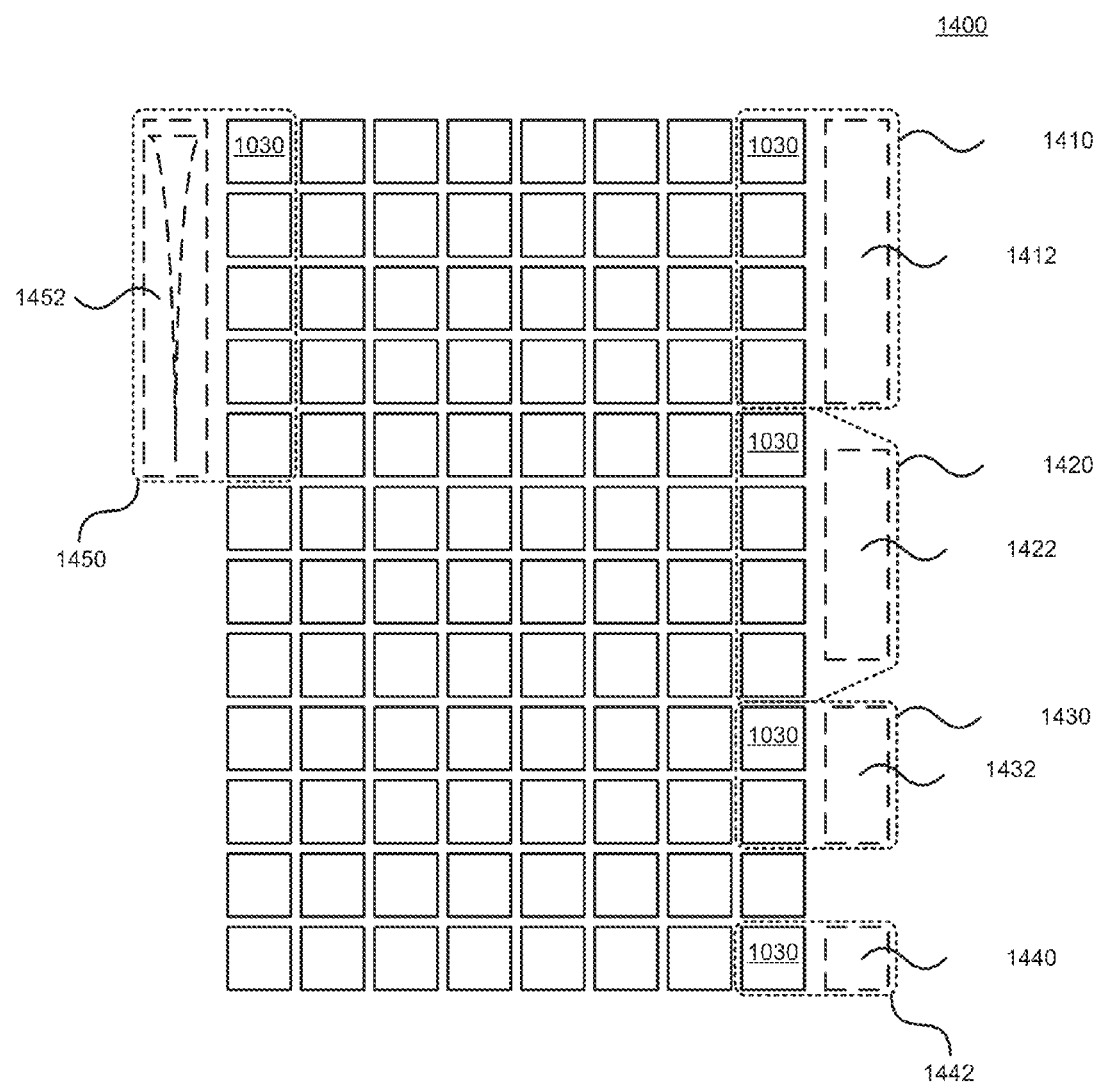
FIG. 14 illustrates various embodiments of virtual sensors arranged in different configurations.

FIG. 14 illustrates an embodiment of an array 1400 wherein different virtual sensors or groups of virtual sensors may be assigned to different buttons or functions. In various embodiments, different numbers of virtual sensors may be grouped together to perform a single operation, such as a button. For example, a group of four virtual sensors 1410 may be grouped together to detect the activation of a single button 1412. The activation of button 1412 may be based on any of the virtual sensors having a value greater than a threshold in one embodiment. In other embodiment, the sum of all of the virtual sensors, the average of all of the virtual sensors, or the minimum of all of the virtual sensors may be used to determine whether or not a button has been activated (or some other function otherwise selected). In other embodiments, a group of four virtual sensors may be grouped together to detect the activation of a single button 1422 that is smaller than the area covered by the four virtual sensors. In still another embodiment fewer virtual sensors may be grouped in a pair 1430 assigned to a smaller virtual sensor. Still, a single virtual sensor 1442 may be assigned its own group 1440. In other embodiments, different numbers of virtual sensors may be grouped together to perform more complex operations, such as a slider. For example, a group of five virtual sensors 1450 may be used to detect movement of a contact along those virtual sensors for a slider sensor 1452. A slider may be use for volume control, brightness control, scrolling, or other features that require resolution greater than is native to the virtual sensors themselves. The control elements of the slider sensor 1452 or buttons 1412, 1422, 1432, and 1434 may be associated with locations outside the display area as shown in FIG. 12 (located within groups 1210, 1220, 1230, 1240.1 or 1240.2). These locations may be along the same plane as the capacitance sensing electrodes (in the case of 1230, 1240.1, and 1240.2) in one embodiment. In another embodiment, the locations outside the display area may be along a plane or axis that is perpendicular, or otherwise different, from the capacitance sensing electrodes, as illustrated by virtual sensors 765 in FIG. 7.

Figure 15:
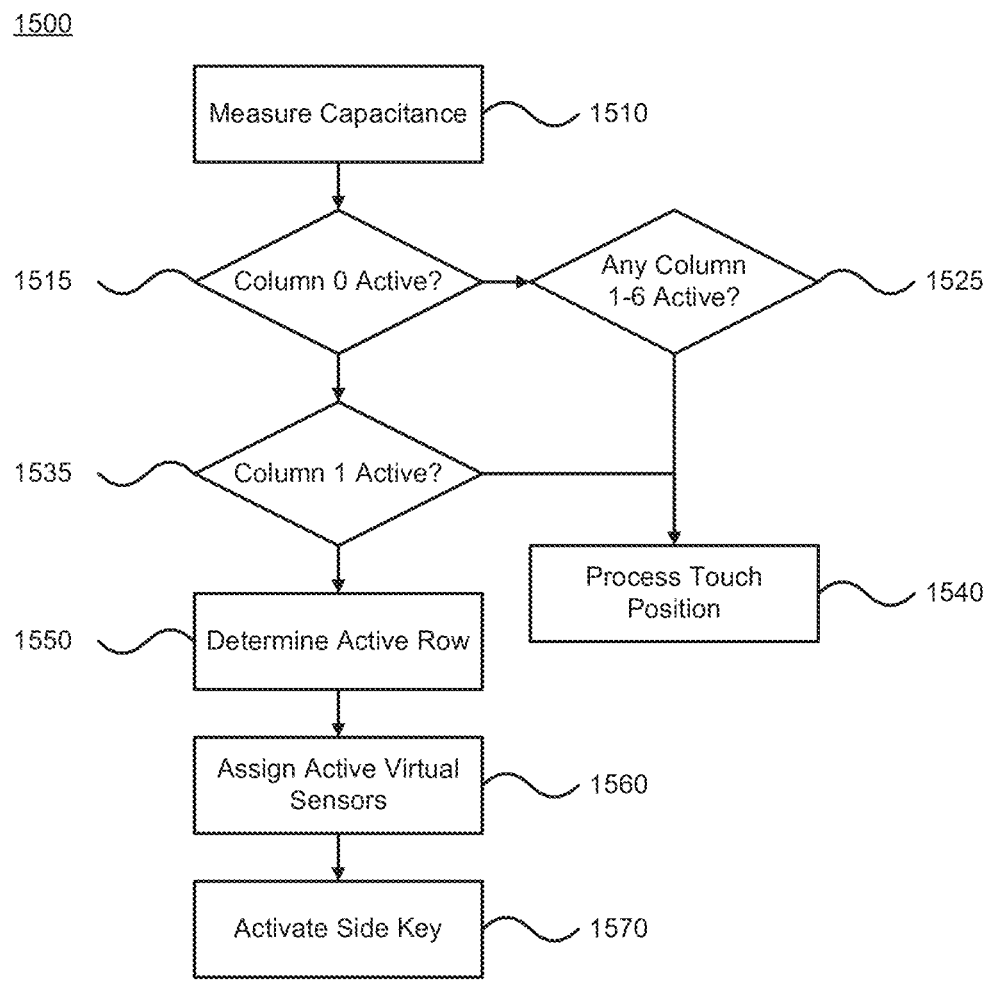
FIG. 15 illustrates a method for determining activation of side keys using virtual sensors in a self capacitance sensing array, according to one embodiment.

FIG. 15 illustrates a method for determining activation of a side key using virtual sensors in a self capacitance touchscreen, according to one embodiment. For clarity of explanation, only virtual sensors on the vertical edges are demonstrated. However one of ordinary skill in the art would understand that a similar process may be used with virtual sensors on horizontal edges by switching the roles of the rows and columns. Capacitance for the panel may be measured in step 1510. The capacitance measurement may be for the entire panel (all columns and all rows) or it may be for a subset of the panel, including the vertical edge columns. For detection of activation of side keys on the left side of the touch-screen device, the activation of the left-most column ("column 0") is determined in step 1515. The activation of column 0 may be determined by comparing the digital representation of capacitance measured on column 0 to a threshold and, if it is greater than the threshold, deemed "active." If column 0 is not active according to step 1515 and other columns in the center of the touchscreen device are active in step 1525, a position of touch on the touchscreen device may be processed in step 1540. If column 0 is active, and column 1 is active in step 1535, a contact may be determined at the edge of the sensing area and the position of the touch calculated. If column 0 is active and column 1 is not active, active rows may be determined in step 1550 and a value corresponding to the activation level of column 0 and the active row assigned to a virtual sensor in step 1560. If the virtual sensor is associated with a defined side key or other function, that side key or function may be activated in step 1570.

Figure 16A:
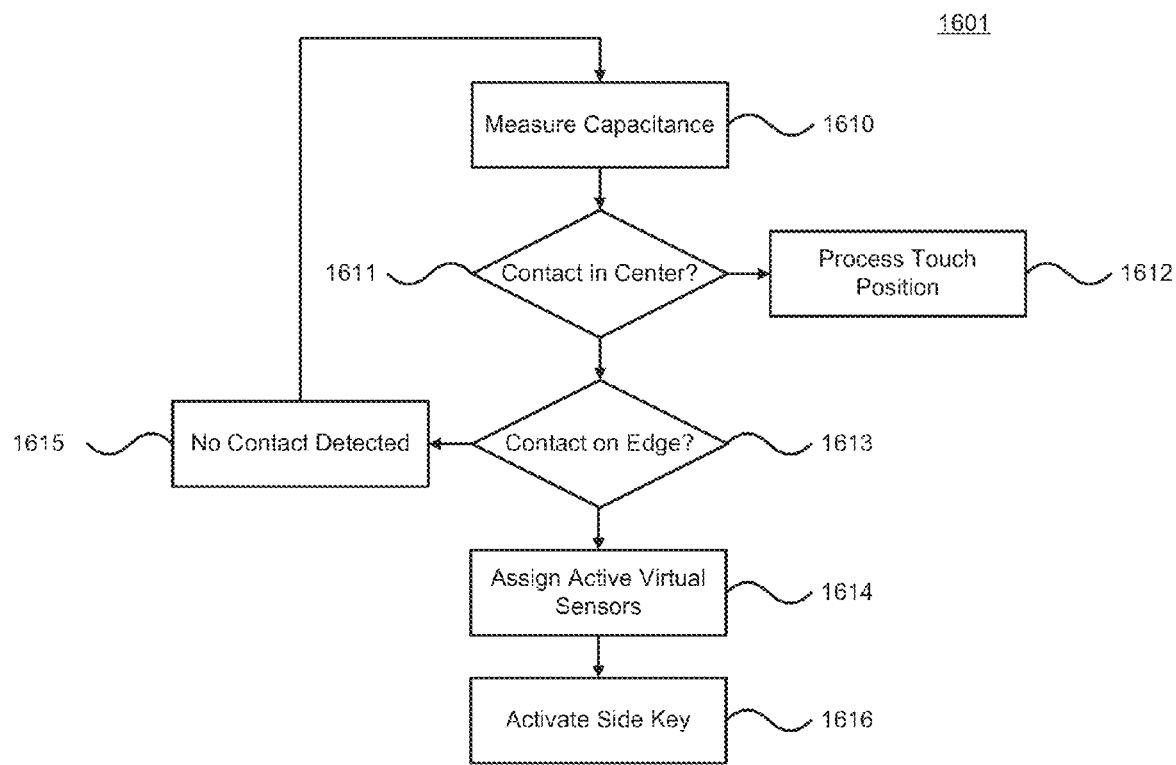
FIG. 16A illustrates a method for determining activation of side keys using virtual sensors in a mutual capacitance sensing array, according to one embodiment.
Figure 16B:
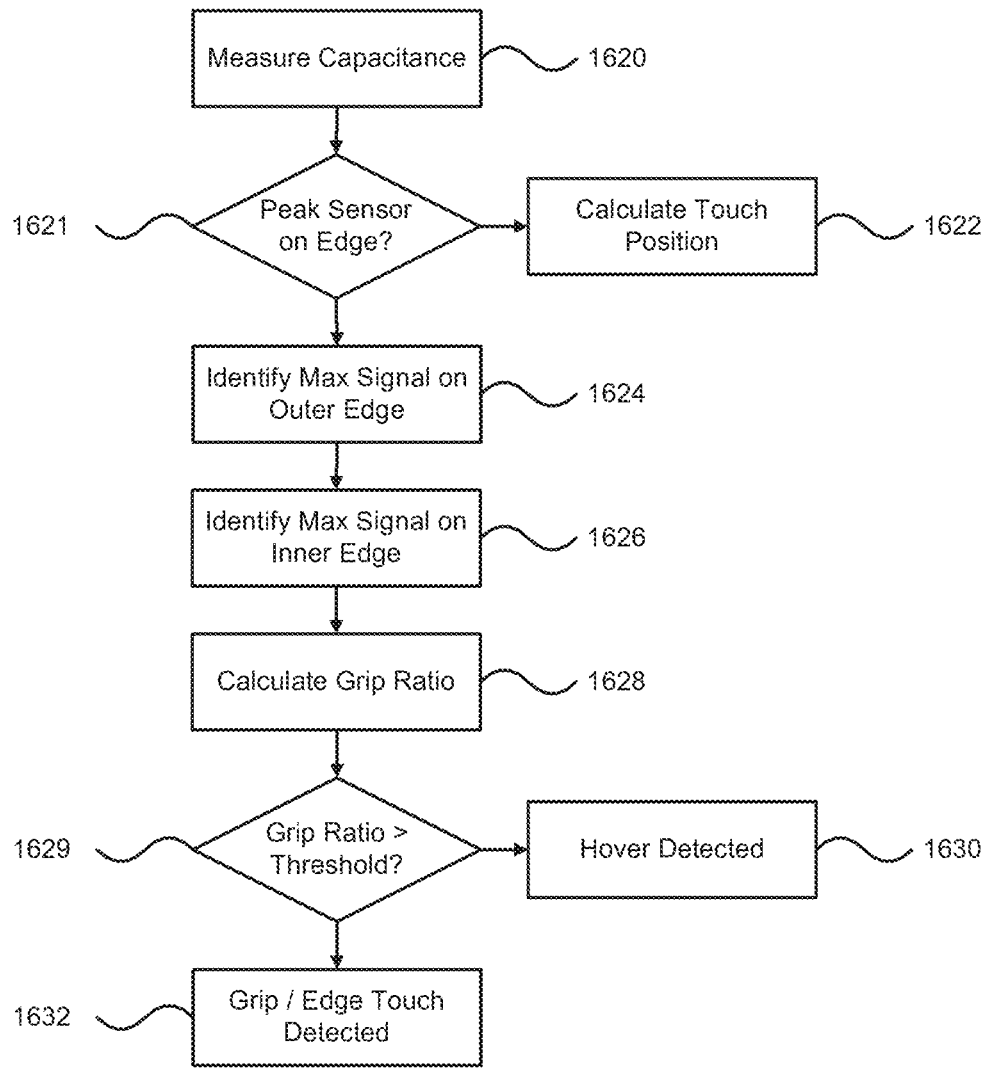
FIG. 16B illustrates a method for determining whether a hover or a grip contact, which may be used to detect side key activation with virtual sensors, is present on a touchscreen device, according to one embodiment.

FIG. 16A illustrates a method 1601 for determining activation of a side key using virtual sensors in a mutual capacitance touchscreen, according to one embodiment. Capacitance is measured in step 1610. If a contact is in the center of the touchscreen (unit cells in the center of the touchscreen have capacitance change values high enough to register as active) in step 1611, a touch position of the contact may be processed in step 1612. If the contact is not in the center of the touchscreen but is rather on the edge in step 1613, the value of a unit cell or intersection may be assigned to the virtual sensor in step 1630. If the virtual sensor is associated with a defined side key or other function, that side key or function may be activated in step 1616. If there is no contact on the edge in step 1613 and no contact in the center in step 1611, no contact is detected in step 1615 and capacitance may be measured again in step 1610. FIG. 16B illustrates a method 1602 for determining if a contact is on an edge of a touchscreen or whether a different interaction, such as a hover, occurs. Capacitance measurement for the panel is first measured in step 1620. Values for each unit cell are assigned similar to that of the array of unit cells 1301 in FIG. 13B. If a peak sensor (or unit cell is located on the edge of the touchscreen in step 1621, the maximum signal is identified on the outer edge of the touchscreen (see element 1361 of FIG. 13C) in step 1624. If the peak sensor (or unit cell) is not located on the edge of the touchscreen in step 1621, the touch position may be calculated in step 1622. Touch position may be calculated in a manner similar to the method illustrated in FIGS. 6A-F. After the maximum signal is identified on the outer edge of the touchscreen in step 1624, a maximum signal may be identified on the inner edge of the touchscreen in block 1626. The inner edge of the touchscreen may be adjacent to the outer edge in one embodiment. In another embodiment, the inner edge of the touchscreen may be located closer to the center, as illustrated by elements 1363 and 1365 of FIG. 13C. A grip ratio may be calculated from the maximum signals on the inner and outer edges in step 1628. In various embodiments, the grip ratios may be calculated by:

dividing the maximum signal on the outer edge by the maximum signal on the inner edge, subtracting the maximum signal on the inner edge from the maximum signal on the outer edge, calculating a linear relationship from multiple maximum signals (from the outer edge, middle edge, and inner edge), calculating a non-linear relationship from multiple maximum signals at an edge (from the outer edge, middle edge, and inner edge) or from sensors or unit cells along a row or column beyond just those near to the edge, calculating second-order relationships between the outer edge and middle edge and the middle edge and the inner edge or from sensors or unit cells along a row or column beyond just those near to the edge, or other methods capable of identifying a numerical representation of the change in measured capacitances of multiple unit cells.

The inner edge of the touchscreen may be adjacent to the outer edge in one embodiment. In another embodiment, the inner edge of the touchscreen may be located closer to the center, as illustrated by elements 1363 and 1365 of FIG. 13C. If the grip ratio is greater than a threshold value, a grip of the touchscreen device may be detected. Alternatively, identification of an active sensor using method 1602 may be used to trigger creation and population of virtual sensors in steps 1560 of method 1500 and 1614 of method 1601

While method 1602, using data from the array of unit cells 1301, discusses detection of a grip contact with regard to mutual capacitance and individual unit cells, in various embodiments, multiple columns or rows of mutual capacitance unit cells may be grouped together and the sum (or average) of their values used to determine grip contact or virtual sensor activation. In still other embodiments, self capacitance rows and columns may be used to determine grip contacts or virtual sensor activation. In such embodiments, the grip ratios may be calculated from the value of row or column sensors in their entirety, similar to FIG. 10A, and the grip ratios of step 1628 of FIG. 16B may be calculated from the self capacitance values of rows or columns.

In various embodiments, virtual sensors and sensors along the periphery of a touchscreen display may be used to detect biometric information of the user. For example, virtual sensors and sensors along the periphery of the touchscreen display may be used to detect the size of the hand that is holding the device, whether the device is being held by a left hand or a right hand, of if the user is using the same hand to interact with the graphical user interface (GUI) as they are to hold the device.

Figure 17A:
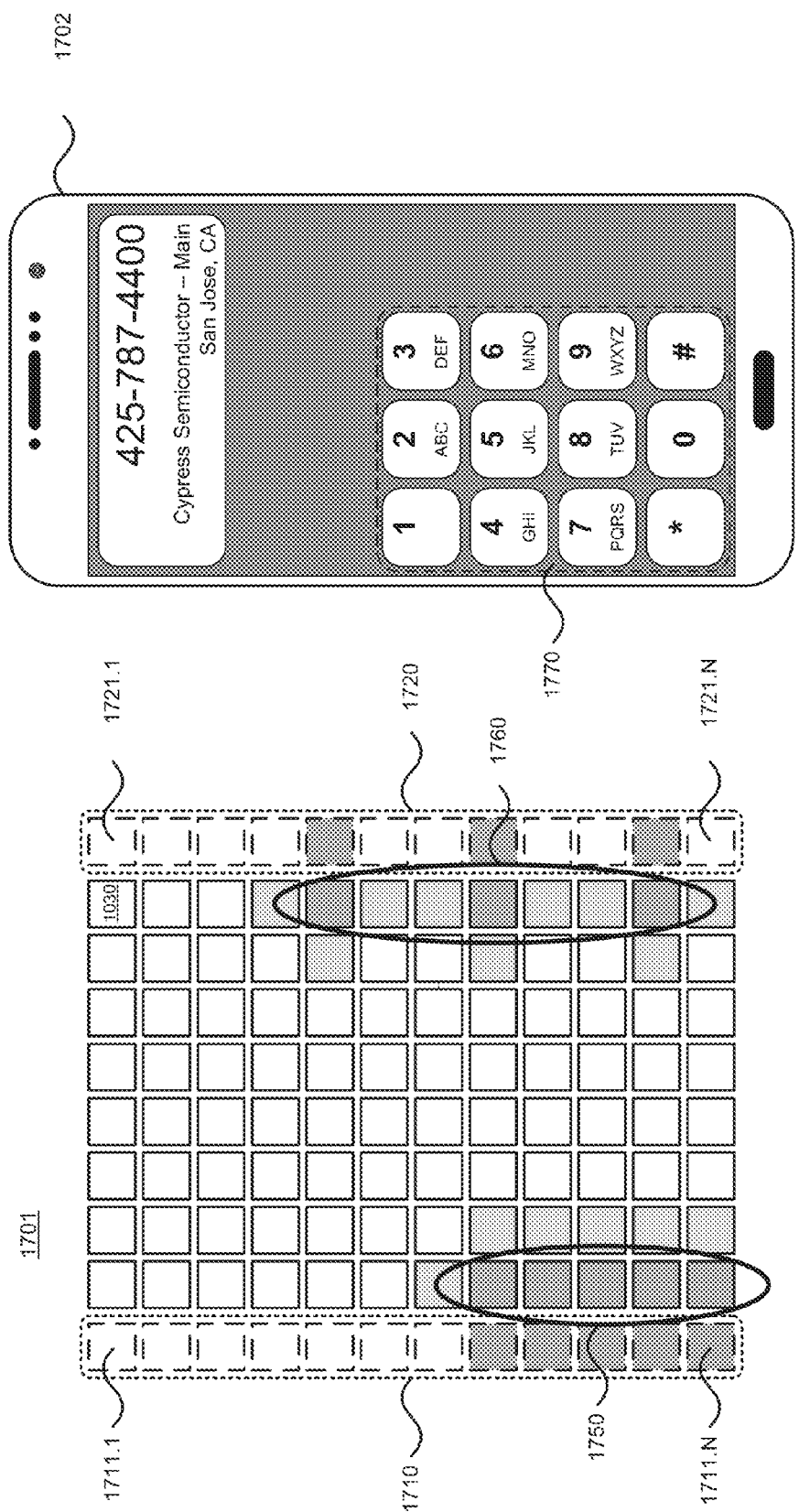
FIG. 17A illustrates a representation of activated virtual sensors for a left-handed operation with a larger contact area on a touchscreen device and an adjusted graphical user interface, according to one embodiment.

FIG. 17A illustrates an embodiment where various virtual sensors are recognized in a pattern indicative of a user holding a device 1702 in their left hand. In this embodiment, virtual sensors 1711.1-1711.N of group 1710 and 1721.1-1721.N of group 1720 are activated in patterns 1750 and 1760, respectively. In one embodiment, patterns 1750 and 1760 either alone or in combination may correspond to a larger single left hand operating the touchscreen device. As a result, the buttons 1780 that are displayed on the screen may be shifted to the left to make them easier to reach with the thumb of the left hand. In another embodiment, the pattern of electrodes along the edge of the device may be used to determine the height of the buttons as a group, or the size of the buttons. That is, a larger signature on the edge of the device may be indicative of a larger hand, thus allowing for larger buttons that are both easier to see and easier to press for larger fingers.

Figure 17B:
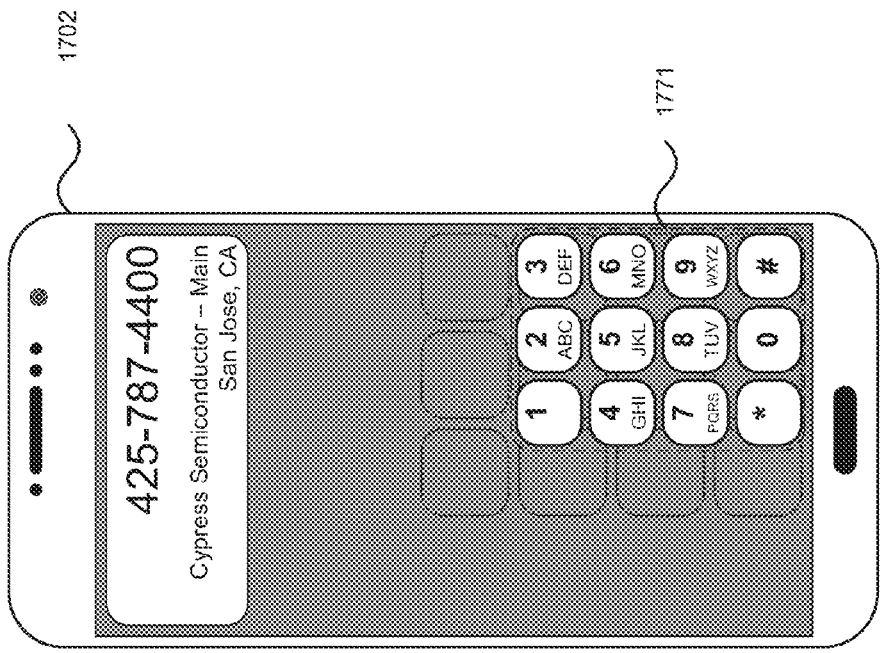
FIG. 17B illustrates a representation of activated virtual sensors for a right-handed operation with a smaller contact area on a touchscreen device and an adjusted graphical user interface, according to one embodiment.
Figure 17B:
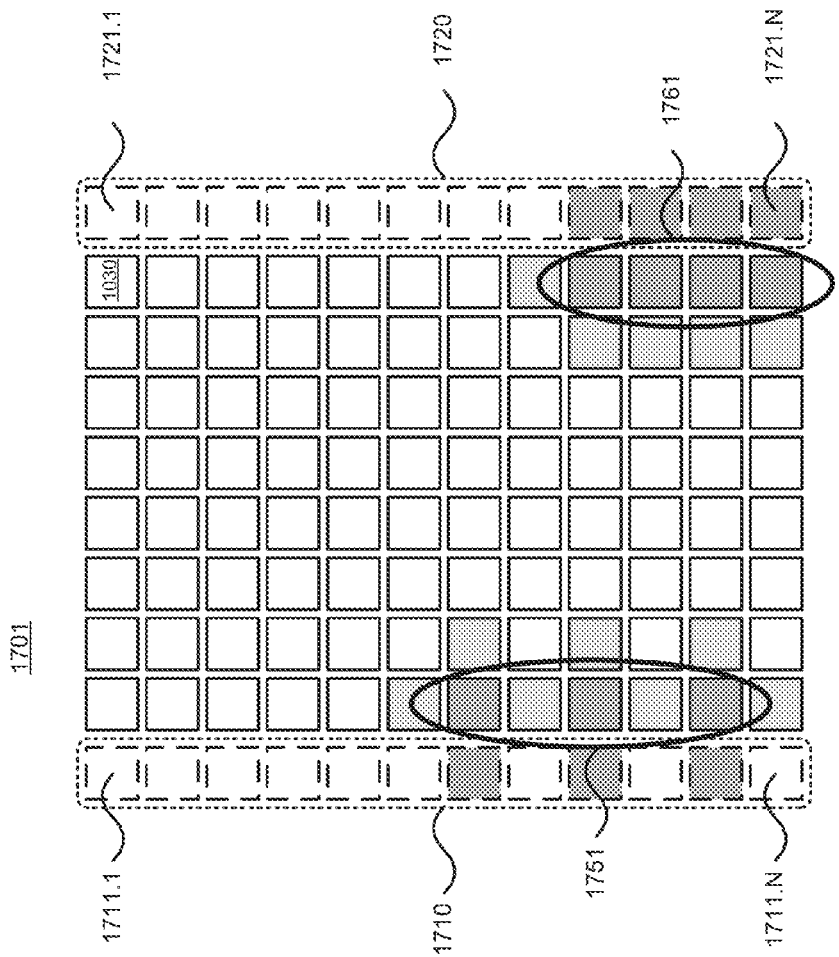

FIG. 17B illustrates an embodiment where various virtual sensors are recognized in a pattern indicative of a user holding a device 1702 in their right hand. In this embodiment, virtual sensors 1711.1-1711.N of group 1710 and 1721.1-1721.N of group 1720 are activated in patterns 1751 and 1761, respectively. In one embodiment, patterns 1751 and 1761 either alone or in combination may correspond to a smaller single right hand operating the touchscreen device. As a result, the buttons 17871 that are displayed on the screen may be shifted to the right and made smaller to make them easier to reach with the thumb of a smaller right hand.

Figure 17C:
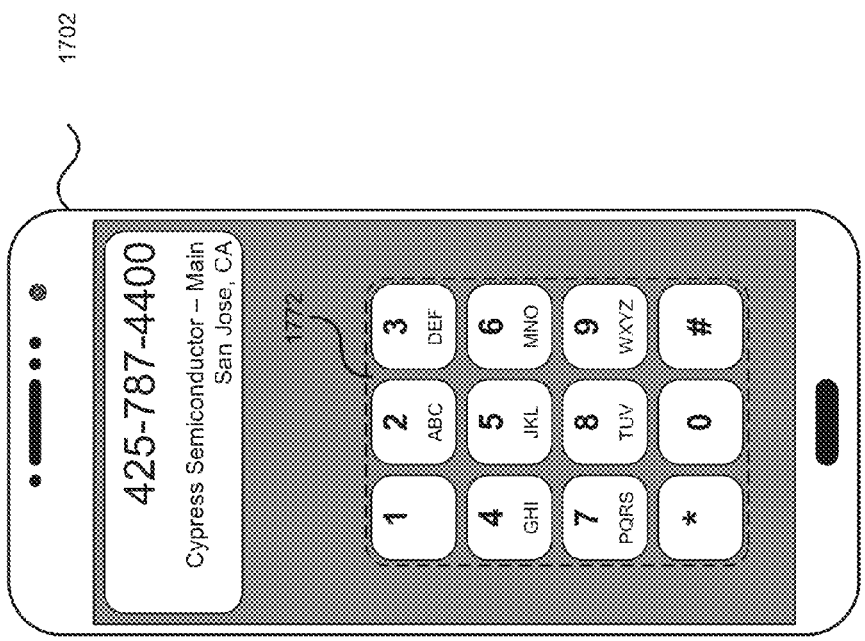
FIG. 17C illustrates a representation of a graphical user interface configured to respond to a detected two-handed operation of a touchscreen device and an adjusted graphical user interface, according to one embodiment.
Figure 17C:
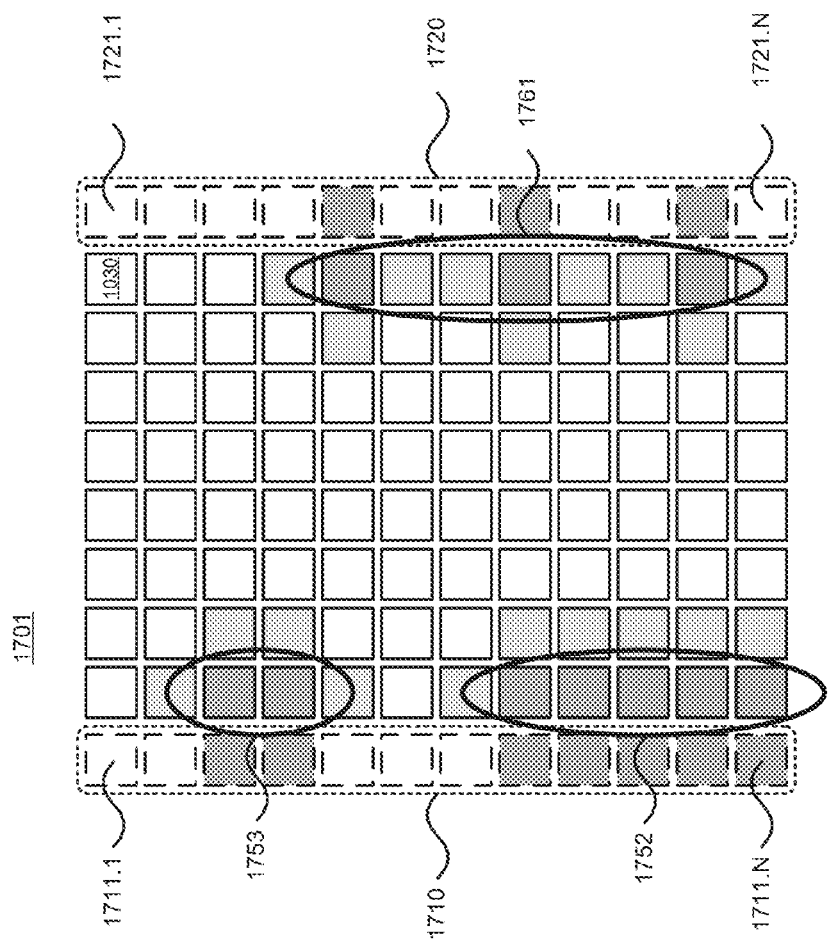

FIG. 17C illustrates an embodiment where various virtual sensors are recognized in a pattern indicative of a user holding a device 1702 in their left hand, but interacting with the touchscreen with their right hand. In this embodiment, virtual sensors 1711.1-1711.N of group 1711 and 1721.1-1721.N of group 1720 are activated in patterns 1752, 1753, and 1761. In one embodiment, patterns 1752, 1753, and 1762 either alone or in combination may correspond to a left hand holding the touchscreen device while a separate hand interacts with the touchscreen. As a result, the buttons 1772 that are displayed on the screen may be centered on the display and made larger.

The examples of FIGS. 17A-C are intended to be illustrative of the detection of biometric information only and do not represent a complete list of possible features. In various embodiments, virtual sensors and sensors along the periphery of a touchscreen display may be used to detect specific users (through repeated patterns that are specific), as a security device (by requiring a certain configuration of virtual sensors to be active to unlock a screen), or allow only certain applications to open, applications that are only accessible with certain virtual sensor and periphery sensor combinations.

FIG. 18 illustrates a touchscreen device mode change 1800 by detection of activation of certain virtual sensors, according to one embodiment. The example of FIG. 18 illustrates a change from a text entry interface 1810 to a camera (or image capture) interface 1820. In one embodiment, the mode change may be caused by the detection of a tilt 1830 of the touchscreen device 1801 coupled with activation of at least one virtual sensor 1840.1-1840.4 corresponding to the use of the touchscreen device 1801 as a camera. In various embodiments, different numbers and configurations of virtual sensors may be used to detect the mode change. In other embodiments, different activations and configurations of activated virtual sensors may be used to enter different interfaces of the touchscreen device. While a camera is shown in FIG. 15, other interfaces, such a file folder, email, home screen, or other applications may be triggered by the combination of a sensor input and the activation of at least one virtual sensor.

Furthermore, while a gyroscope of accelerometer are often used to detect a change in the orientation of a touchscreen device, other methods may be employed, such as using the camera on the same side of touchscreen device as the display to recognize faces and align the display accordingly or using the camera opposite the touchscreen to detect landscape features (such as trees, buildings, a horizon, etc.) and align the display.

FIG. 19 illustrates an embodiment of a method 1900 for detecting a mode change of a touchscreen device as illustrated in FIG. 18. If a tilt sensor is active in step 1905, virtual sensors are checked for activation in step 1915. If the tilt sensor is not active, the touchscreen will remain in the present mode in step 1940. A tilt sensor may be a gyroscope, an accelerometer, or other discrete sensor in one embodiment. In another embodiment, the tilt sensor may be a camera on the touchscreen device that is configured to recognize various patterns and detect the orientation of the touchscreen device by comparison of those patterns to expected patterns. For example, the camera and processing logic may detect a horizon, buildings, or other portions of the landscape. In one embodiment, the camera may detect eyes of a subject or of a person operating the touchscreen device. If the virtual sensors are active and the tilt sensor is active, the touchscreen device may enter camera mode in step 1920. At any point the touchscreen device may make sure that the tilt sensor and virtual sensors have remained active and exit camera mode if either or both has been deactivated. If the touchscreen device is in camera mode, the user may choose to take a picture in step 1930. After the picture has been taken, the touchscreen device may remain in camera mode until the tilt sensor or virtual sensors are deactivated. However, in one embodiment, after the picture has been taken, the touchscreen device may return to the previous mode to process the picture. In the example shown in FIG. 18, the touchscreen device may return to a text entry mode to display a text entry interface 1810 after the picture has been taken to allow the user to send the picture to another party. In one embodiment, a specific configuration of virtual sensors may be required for the mode change. In another embodiment, a number of active virtual sensors may be required, but their position may not be specified. The expected sensors, which may be produced on a display unit as keys, may be different for different mode changes. Users may not be aware that virtual sensors are used to detect the activation of buttons or keys on the edge of the touchscreen device, so the display may merely indicate that the user must touch that portion of the display to activate the key. In another embodiment, the touchscreen device may detect a users presence in various or specific positions along the edge of the touchscreen device and make decisions accordingly, without conscious effort by the user.

While a shutter button is discussed with regard to FIG. 19, other camera functions may be implemented by virtual sensors, as shown in FIG. 20A-D. For example, once the camera interface 1820 is active, the virtual sensors 1840.1-1840.1 may be used as a shutter, entry of camera modes, or to control zoom and optical characteristics of the camera. FIGS. 20A and 20B illustrate an embodiment of camera use that recognizes four contacts virtual sensors 1840.1-1840.4 substantially at the corners of the display. The release, illustrated by the absence of an active and subsequent press of one of the virtual sensors in a location corresponding to a shutter button, which is very often on the top right of the camera, may cause the touchscreen device, operating in camera mode, to capture an image and store it to memory.

FIGS. 20C and 20D illustrate more advanced features that may be enabled by the virtual sensors. In one embodiment, virtual sensors on the "top" of the touchscreen device when in camera mode may be used to zoom in or out. In another embodiment, virtual sensors on the "bottom of the touchscreen device when in camera mode may be used to adjust the brightness of the camera. In other embodiments, the various configurations of the virtual sensors may be used to control any element of a camera and display functionality, such as F-stop, saturation, hue, contrast, or a myriad of menu options, which providing the user with a most unfettered view of the display.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "integrating," "comparing," "balancing," "measuring," "performing," "accumulating," "controlling," "converting," "accumulating," "sampling," "storing," "coupling," "varying," "buffering," "applying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   measuring capacitance of a plurality of sensors of an array, each of the sensors within a sensing area defined by a touchscreen display;
   detecting a presence of a conductive object proximate to at least one of the plurality of sensors near an edge of the touchscreen display based on the measured capacitance;
   assigning a capacitance value to at least one virtual sensor derived from the measured capacitance of the at least one of the plurality of electrodes near the edge of the touchscreen display, wherein the at least one virtual sensor is outside the sensing area defined by the touchscreen display; and
   activating at least one control element associated with a location outside the sensing area defined by the touchscreen display area based on the assigned capacitance value of the at least one virtual sensor.

2. The method of claim 1, wherein the capacitance on the plurality of sensors is a mutual capacitance.

3. The method of claim 1, wherein the capacitance on the plurality of sensors is a self capacitance.

4. The method of claim 1, wherein the at least one virtual sensor corresponds to at least one of a plurality of control elements on an edge of a touchscreen device.

5. The method of claim 1, further comprising:
   detecting a change in an orientation of the touchscreen display; and
   if the at least one activated control element outside the touchscreen display area corresponds to an expected control element, causing a device comprising the touchscreen display to enter a second mode.

6. The method of claim 5, wherein the second mode is an image capture mode.

7. The method of claim 6, wherein the at least one control element comprises a shutter button.

8. The method of claim 1, wherein the at least one control element comprises a slider comprising a plurality of virtual sensors.

9. A user interface device comprising:
a first plurality capacitance sensing electrodes disposed along a first axis of an array;
a second plurality of capacitance sensing electrodes disposed along a second axis of an array;
a controller configured to:
measure a mutual capacitance between the first and second pluralities of capacitance sensing electrodes;
detect a presence of a conductive object proximate to an edge of the array; and
assign a capacitance value to at least one virtual sensor derived from the measured capacitance between the first and second pluralities of capacitance sensing electrodes, the at least one virtual sensor located outside an area defined by the first and second pluralities of sensing electrodes and;
a processor configured to determine activation of at least one control element along an edge of the user interface device based on the assigned capacitance value of the at least one virtual sensor.

10. The user interface device of claim 9, wherein the processor is further configured to detect a change in an orientation of the user interface device and enter a mode of operation usable with the virtual sensors and the changed orientation.

11. The user interface of claim 9, wherein the processor is further configured to:
detect biometric information of a user; and
change a characteristic of information on a display based on the biometric information of the user.

12. The user interface device of claim 9, wherein the control element is a shutter button of a camera.

13. The user interface device of claim 9, wherein the control element is a volume control interface.

14. The user interface device of claim 9, the presence of a conductive object on the edge of the display is based on capacitance from a plurality of columns of unit cells at intersections between the first and second pluralities of electrodes.

15. A handheld display device comprising:
a display;
a plurality of capacitance sensing electrodes disposed substantially over the display, the plurality of capacitance sensing electrodes forming capacitance sensing nodes; and
a touch controller configured to measure capacitance on the plurality of capacitance sensing electrodes and determine activation states for at least one virtual sensor, wherein:
the at least one virtual sensor is assigned a capacitance value derived from the measured capacitance of the at least one of a plurality of capacitance sensing electrodes near an edge of the touchscreen display,
the at least one virtual sensor is positioned outside an area defined by the plurality of capacitance sensing nodes, and the touch controller is configured to detect a conductive object on an edge of the display.

16. The handheld display device of claim 15, wherein the at least one virtual sensor is positioned on a surface of the handheld display device substantially perpendicular to a substrate on which the plurality of capacitance sensing electrodes are disposed.

17. The handheld display of claim 15, wherein the at least one virtual sensor is aligned with at least one user interface element.

18. The handheld display of claim 17, wherein the at least one user interface element is a slider configured to output a value at a resolution greater than the resolution of the at least one virtual sensor.

19. The handheld display of claim 17, wherein the at least one user element is a button displayed on the edge of the display and configured to be activated by a presence of a conductive object outside the area defined by the plurality of capacitance sensing nodes.

* * * * *